United States Patent
Tay

(10) Patent No.: US 8,159,600 B2
(45) Date of Patent: Apr. 17, 2012

(54) AUTO-FOCUS IMAGE SYSTEM

(76) Inventor: Hiok Nam Tay, Singapore (SG)

( * ) Notice: Subject to any disclaimer, the term of this patent is extended or adjusted under 35 U.S.C. 154(b) by 0 days.

(21) Appl. No.: 12/962,649

(22) Filed: Dec. 7, 2010

(65) Prior Publication Data

US 2011/0134312 A1    Jun. 9, 2011

Related U.S. Application Data

(60) Provisional application No. 61/267,436, filed on Dec. 7, 2009.

(51) Int. Cl.
*H04N 5/232* (2006.01)
*G03B 13/32* (2006.01)
*G02B 15/14* (2006.01)

(52) U.S. Cl. .............................. 348/345; 396/89; 359/698

(58) Field of Classification Search .......... 348/345–356, 348/362–363; 396/89–93, 102–107; 359/698
See application file for complete search history.

(56) References Cited

U.S. PATENT DOCUMENTS

| | | | |
|---|---|---|---|
| 7,586,520 B2 * | 9/2009 | Igarashi | 348/208.6 |
| 2002/0114015 A1 | 8/2002 | Fujii | |
| 2003/0099044 A1 | 5/2003 | Fujii | |
| 2005/0231603 A1 * | 10/2005 | Poon | 348/208.99 |
| 2005/0249429 A1 * | 11/2005 | Kitamura | 382/255 |
| 2006/0078217 A1 * | 4/2006 | Poon et al. | 382/255 |
| 2006/0249429 A1 * | 11/2006 | Iki et al. | 208/209 |
| 2008/0309777 A1 * | 12/2008 | Aoyama | 348/222.1 |
| 2009/0102964 A1 | 4/2009 | Yeo et al. | |

OTHER PUBLICATIONS

PCT/IB2010/055649 ISR & WO (transmitted to USPTO via fax separately on same date).

* cited by examiner

*Primary Examiner* — Trung Diep

(57) ABSTRACT

An auto focus image system that includes a pixel array coupled to a focus signal generator. The pixel array captures an image that has at least one edge with a width. The focus signal generator may generate a focus signal that is a function of the edge width and/or statistics of edge widths. A processor receives the focus signal and/or the statistics of edge widths and adjusts a focus position of a focus lens. The edge width can be determined by various techniques including the use of gradients. A histogram of edge widths may be used to determine whether a particular image is focused or unfocused. A histogram with a large population of thin edge widths is indicative of a focused image. The generator may eliminate an edge having an asymmetry of a gradient profile of an image signal. The generator may also eliminate an edge that fails a template for an associated peaking of the gradient.

20 Claims, 19 Drawing Sheets

|    | C1 | C2 | C3 | C4 | C5 | C6 |
|----|----|----|----|----|----|----|
| R1 | 10<br>9 V | 10<br>10 V | 10<br>9 V | 2<br>0 | 0<br>0 | 0<br>0 |
| R2 | 3<br>0 | 10<br>8 V | 10<br>11 V | 9<br>10 V | 1<br>0 | 0<br>0 |
| R3 | 1<br>0 | 3<br>1 | 8<br>8 V | 9<br>11 V | 7<br>8 V | 1<br>0 |
| R4 | 0<br>0 | 1<br>0 | 3<br>2 | 7<br>8 V | 8<br>10 V | 7<br>8 V |
| R5 | 0<br>-2 | 0<br>0 | 1<br>1 | 3<br>3 | 7<br>12 H | 6<br>12 H |
| R6 | 0<br>-1 | 0<br>-1 | 0<br>0 | 1<br>2 | 3<br>0 V | 1<br>8 H |

$b = a \cos\phi$ corrects edge width for slant angle $\phi$
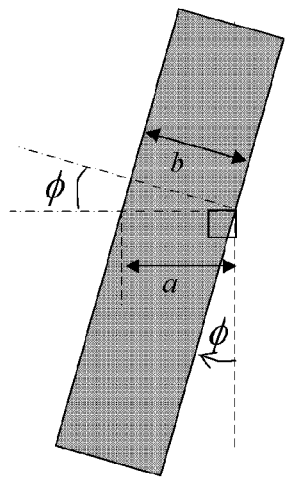
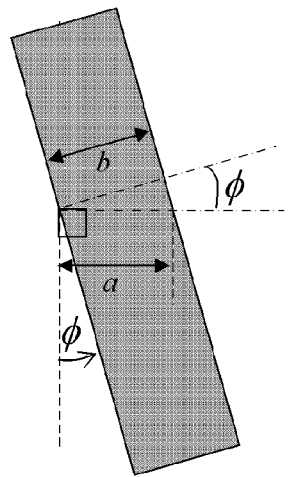
FIG. 6A
FIG. 6B
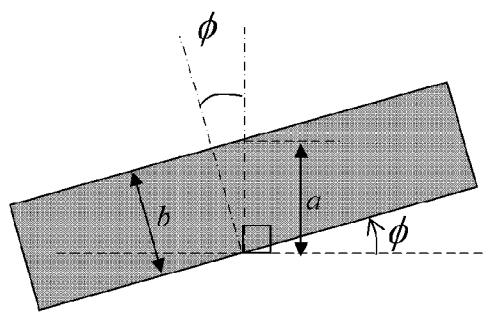
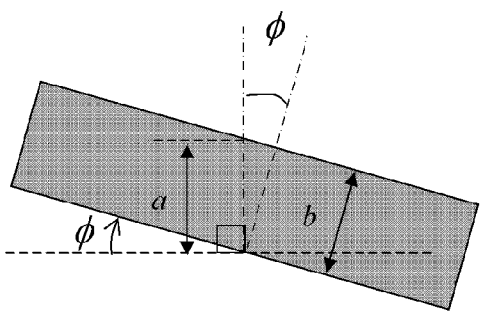
FIG. 6C
FIG. 6D

| | C1 | C2 | C3 | C4 | C5 | C6 |
|---|---|---|---|---|---|---|
| R1 | 0  6 H | 5  10 H | 1  3 | 2  0 | 0  0 | 0  0 |
| R2 | 3  0 | 8  8 H | 15  11 V | 19  10 V | 1  0 | 0  0 |
| R3 | 1  0 | 3  1 | 18  8 V | 19  11 V | 17  8 V | 1  0 |
| R4 | 0  0 | 1  0 | 3  2 | 17  8 V | 18  10 V | 7  3 H |
| R5 | 0  2 | 0  0 | 1  1 V | 3  3 | 7  12 H | 6  12 H |
| R6 | 0  1 | 0  1 | 0  0 | 1  2 | 3  0 | 1  8 H |

AUTO-FOCUS IMAGE SYSTEM

CROSS-REFERENCE TO RELATED APPLICATIONS

This application claims priority to U.S. Provisional Patent Application No. 61/267,436 filed on Dec. 7, 2009.

BACKGROUND OF THE INVENTION

1. Field of the Invention

The subject matter disclosed generally relates to auto-focusing electronically captured images.

2. Background Information

Photographic equipment such as digital cameras and digital camcorders may contain electronic image sensors that capture light for processing into still or video images, respectively. Electronic image sensors typically contain millions of light capturing elements such as photodiodes.

Many image capturing devices such as cameras include an auto-focusing system. The process of auto-focusing includes the steps of capturing an image, processing the image to determine whether it is in focus, and if not, generating a feedback signal that is used to vary a position of a focus lens ("focus position"). There are two primary auto-focusing techniques. The first technique involves contrast measurement, the other technique looks at a phase difference between a pair of images. In the contrast method the intensity difference between adjacent pixels is analyzed and the focus is adjusted until a maximum contrast is detected. Although acceptable for still pictures the contrast technique is not suitable for motion video.

The phase difference method includes splitting an incoming image into two images that are captured by separate image sensors. The two images are compared to determine a phase difference. The focus position is adjusted until the two images match. The phase difference method requires additional parts such as a beam splitter and an extra image sensor. Additionally, the phase difference approach analyzes a relatively small band of fixed detection points. Having a small group of detection points is prone to error because noise may be superimposed onto one or more points. This technique is also ineffective if the detection points do not coincide with an image edge. Finally, because the phase difference method splits the light the amount of light that impinges on a light sensor is cut in half or even more. This can be problematic in dim settings where the image light intensity is already low.

BRIEF SUMMARY OF THE INVENTION

An auto focus image system that includes a pixel array coupled to a focus signal generator. The pixel array captures an image that has at least one edge with a width. The generator generates a focus signal that is a function of the edge width and various statistics of edge width. The generator may eliminate an edge having an asymmetry of a gradient profile of an image signal. The generator may also eliminate an edge that fails a template for an associated peaking of the gradient.

BRIEF DESCRIPTION OF THE DRAWINGS

FIG. 6A, 6B are illustrations of a calculation of an edge width of a vertical edge having a slant angle φ;

FIG. 6C, 6D are illustrations of a calculation of an edge width of a horizontal edge having a slant angle φ;

DETAILED DESCRIPTION

Disclosed is an auto focus image system that includes a pixel array coupled to a focus signal generator. The pixel array captures an image that has at least one edge with a width. The focus signal generator may generate a focus signal that is a function of the edge width and/or statistics of edge widths. An auto focus image system that includes a pixel array coupled to a focus signal generator. The pixel array captures an image that has at least one edge with a width. The generator generates a focus signal that is a function of the edge width and various statistics of edge width. The generator may eliminate an edge having an asymmetry of a gradient of an image signal. The generator may also eliminate an edge that fails a template for an associated peaking in the gradient. A processor receives the focus signal and/or the statistics of edge widths and adjusts a focus position of a focus lens. The edge width can be determined by various techniques including the use of gradients. A histogram of edge widths may be used to determine whether a particular image is focused or unfocused. A histogram with a large population of thin edge widths is indicative of a focused image.

Architecture

Figure 1:
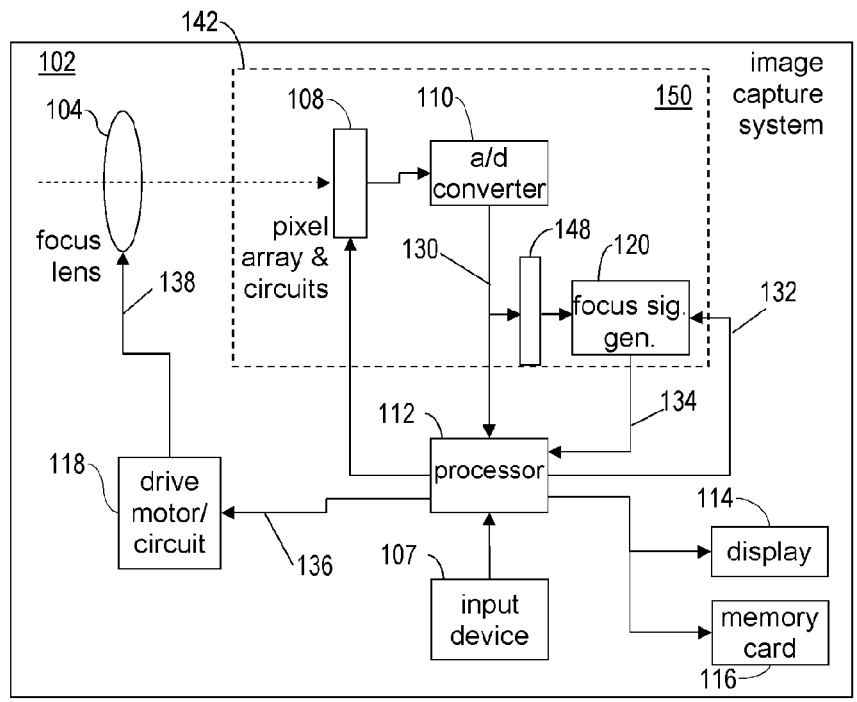
FIG. 1 is a schematic of an embodiment of an auto-focus image pickup apparatus.
Figure 2:
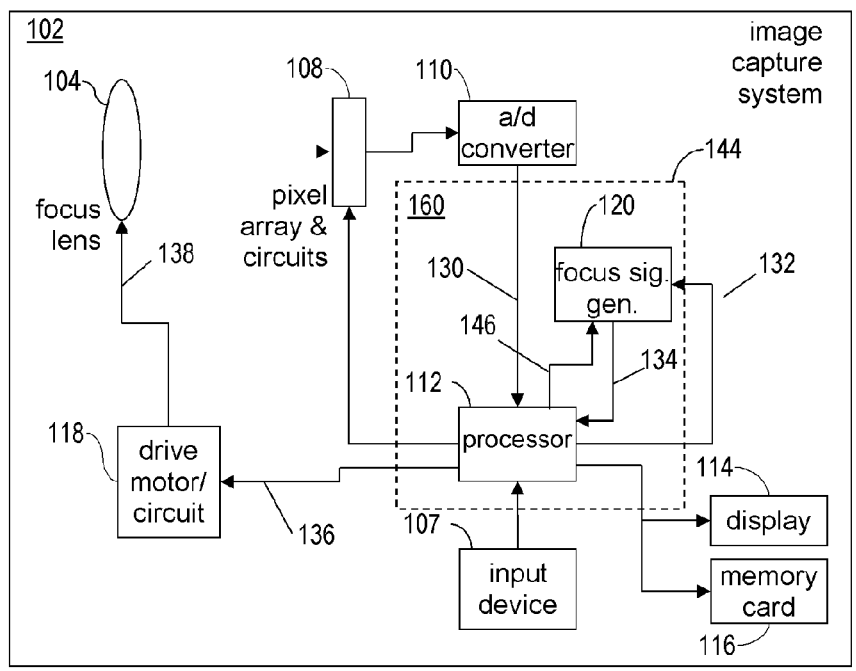
FIG. 2 is a schematic of an alternate embodiment of an auto-focus image pickup apparatus.

Referring to the drawings more particularly by reference numbers, FIG. 1 shows an embodiment of an auto-focus image capture system 102. The system 102 may be part of a digital still camera, but it is to be understood that the system can be embodied in any device that requires controlled focusing of an image. The system 102 may include a focus lens 104, a pixel array and circuits 108, an A/D converter 110, a processor 112, a display 114, a memory card 116 and a drive motor/circuit 118. Light from a scene enters through the lens 104. The pixel array and circuits 108 generates an analog signal that is converted to a digital signal by the A/D Converter 110. The pixel array 108 may incorporate a mosaic color pattern, e.g. the Bayer pattern. The digital signal may be sent to the processor 112 that performs various processes, e.g. color interpolation, focus position control, color correction, image compression/decompression, user interface control, and display control, and to the focus signal generator 120. Where the focus signal generator 120 and the processor 112 reside within different packages, a color interpolation unit 148 may be implemented to perform color interpolation on the digital signal 130 to estimate the missing color signals on each pixel for the focus signal generator 120. Alternately, where the focus signal generator 120 and the processor 112 reside together within a package 144, the focus signal generator 120 may input interpolated color images from the processor 112 on bus 146 as shown in FIG. 2 or a single image signal derived from the original image signal generated from the A/D converter 110, for example a grayscale signal.

The focus signal generator 120 receives a group of control signals 132 from the processor 112, in addition, and may output signals 134 to the processor 112. The output signals 134 may comprise one or more of the following: a focus signal 134, a narrow-edge count, and a set of numbers representing a statistics of edge width in the image. The processor 112 may generate a focus control signal 136 that is sent to the drive motor/circuit 118 to control the focus lens 104. A focused image is ultimately provided to the display 114 and/or stored in the memory card 116. The algorithm(s) used to adjust a focus position may be performed by the processor 112.

The pixel array and circuits 108, A/D Converter 110, focus signal generator 120, and processor 112 may all reside within a package. Alternately, the pixel array and circuits 108, A/D Converter 110, and focus signal generator 120 may reside within a package 142 as image sensor 150 shown in FIG. 1, separate from the processor 112. Alternately, the focus signal generator 120 and processor 112 may together reside within a package 144 as a camera controller 160 shown in FIG. 2, separate from the pixel array 108 and A/D Converter 110.

Focus Signal Generator

Figure 3:
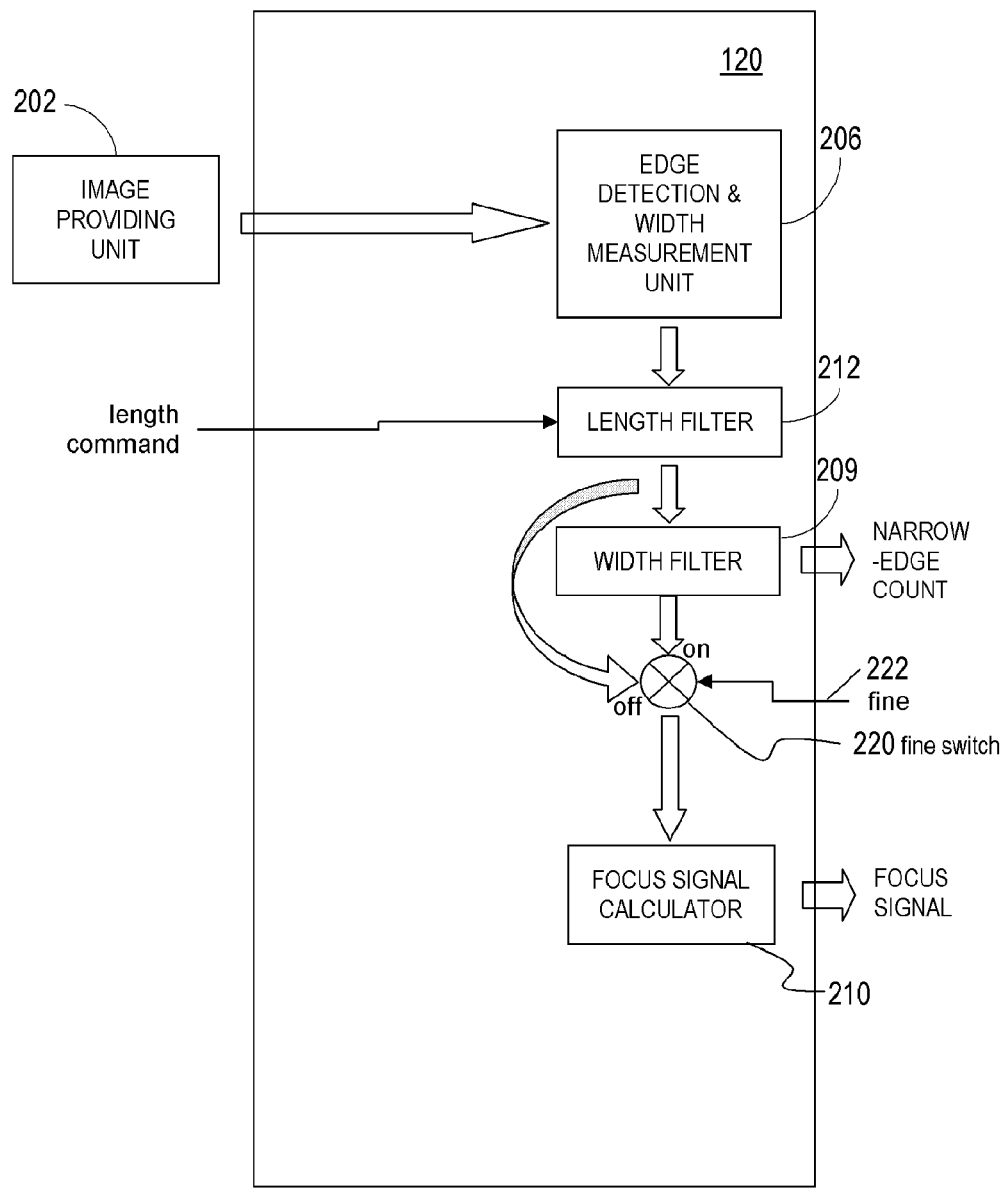
FIG. 3 is a block diagram of a focus signal generator.

FIG. 3 shows an embodiment of a focus signal generator 120 receiving image(s) from a image providing unit 202. The image providing unit 202 may be the color interpolator 148 in FIG. 1 or the processor 212 in FIG. 2. The focus signal generator 120 may comprise an edge detection & width measurement (EDWM) unit 206, a focus signal calculator 210, a length filter 212, and a width filter 209. It may further comprise a fine switch 220 controlled by input 'fine' 222. The focus signal generator 120 may provide a narrow-edge count from the width filter 209 and a focus signal from the focus signal calculator 210, the focus signal being configurable between a fine focus signal and a gross focus signal, selectable by input 'fine' 222. Alternately, both fine focus signal and gross focus signal may be calculated and output as part of output signals 134. The edge detection & width measurement unit 206 receives image(s) provided by the image providing unit 202. In the context of FIGS. 1 and 2, control signals, such as control signal 'fine' 222, may be provided by the processor 112 in signals 132. Also in the context of FIGS. 1 and 2, the output signals 134 may be provided to the processor 112, which functions as a focus system controller that controls the focus position of the focus lens 104 to bring images of objects into sharp focus on the pixel array 108 by analyzing the output signals 134 to detect a sharp object in the image. Various components of the focus signal generator 120 are described below.

The EDWM unit 206 may transform the input image such that the three signals of the image, red (R), green (G) and blue (B) are converted to a single image signal. Several techniques can be utilized to transform an image to a single image. RGB values can be used to calculate a luminance or chrominance value or a specific ratio of RGB values can be taken to form the single image signal. For example, the luminance value can be calculated with the equation $Y=0.2126*R+0.7152*G+0.0722*B$, where Y is luminance value. The single image signal may then be processed by a Gaussian filter or any lowpass filter to smooth out pixel signal values among neighboring pixels to remove a noise.

The focus signal generator 120, 120', 120" is not limited to grayscale signal. It may operate on any one image signal to detect one or more edges in the image signal. Or it may operate on any combination of the image signals, for example Y, R-G, or B-G. It may operate on each and every one of the R, G, B image signals separately, or any one or more combinations thereof, to detect edges. It may form statistics of edge widths for each of the R, G, B image signals, or any combination thereof. It may form a focus signal from statistics of edge widths from one or more image signals.

A gradient of the processed image is then calculated. There are various methods available to calculate the gradient, including Laplacian, and Sobel. Gradients across the columns and the rows may be calculated to detect vertical and horizontal edges respectively, for example using a Sobel-X operator and a Sobel-Y operator, respectively. Sobel X-operator at pixel location [k, q] where k is a row number and q is a column number, is given by the equation $Sx[k, q]=U[k, q+1]-U[k, q-1]$. Sobel Y-operator at the same location is given by the equation $Sy[k,q]=U[k+1,q]-U[k-1,q]$, where U is an image signal of the processed image.

Orientation Tagging

Figures 4, 5:
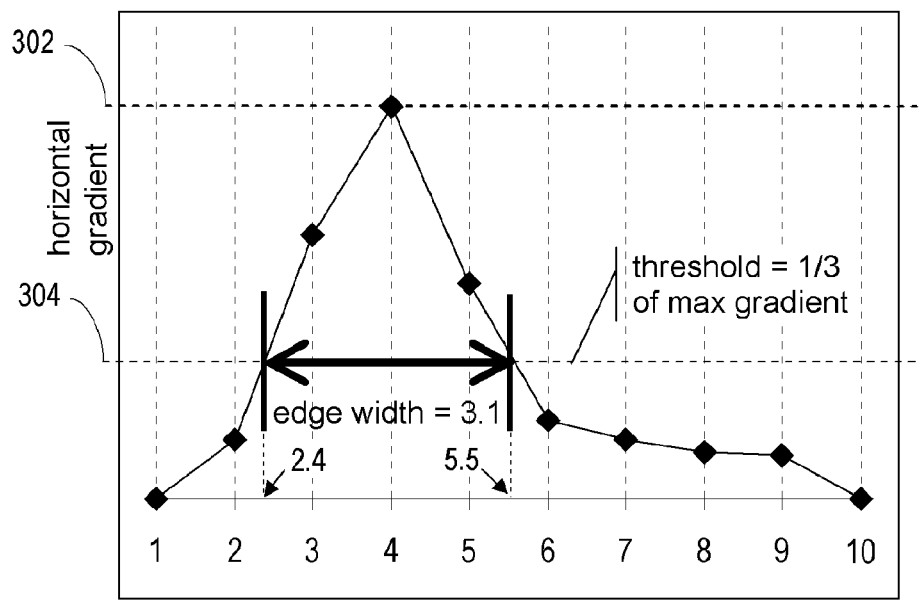
FIG. 4 is an illustration of a horizontal Sobel operator's operation on a image signal matrix.
FIG. 5 illustrates a calculation of edge width from a horizontal gradient.

Each pixel is tagged either a horizontal edge ('H') or a vertical edge ('V') if either vertical or horizontal gradient magnitude exceeds a predetermined lower limit ("elimination threshold"), e.g. 5 for an 8-bit image, or no edge if neither is true. This lower limit eliminates spurious edges due to gentle shading or noise. A pixel is tagged a vertical edge if its horizontal gradient magnitude exceeds its vertical gradient magnitude by a predetermined hysteresis amount or more, e.g. 2 for an 8-bit image, and vice versa. If both gradient magnitudes differ less than the hysteresis amount, the pixel gets a direction tag same as that of its nearest neighbor that has an direction tag already determined. For example, if the image is scanned from left to right in each row and from row to row downwards, a sequence of inspection of neighboring pixels may be the pixel above first, the pixel above left second, and the pixel on the left third, and the pixel above right last. Applying this hysteresis helps to ensure that adjacent pixels get similar tags if each of them has nearly identical horizontal and vertical gradient magnitudes. FIG. 4 illustrates the result of tagging on a 6-by-6 array of horizontal and vertical gradients. In each cell, the horizontal gradient is in the upper-left, vertical gradient is on the right, and direction tag is at the bottom. Only pixels that have either horizontal or vertical gradient magnitude exceeding 5 qualify at this step as edge pixels are printed in bold and get direction tags.

The image, gradients and tags may be scanned horizontally for vertical edges, and vertically for horizontal edges. Each group of consecutive pixels in a same row, having a same horizontal gradient polarity and all tagged for vertical edge may be designated a vertical edge if no adjacent pixel on left or right of the group are likewise. Likewise, each group of consecutive pixels in a same column having a same vertical gradient polarity and all tagged for horizontal edge may be designated a horizontal edge if no adjacent pixel above or below the group satisfies the same. Thus horizontal and vertical edges may be identified.

Edge Width

Each edge may be refined by removing pixels whose gradient magnitudes are less than a given fraction of the peak gradient magnitude within the edge. FIG. 5 illustrates this step using a refinement threshold equal to one third of the edge's peak gradient magnitude, refining the edge width down to 3 from the original 9. This edge refinement distinguishes the dominant gradient component that sets the apparent edge width that dominates visual perception of the edge's sharpness despite an image having multiple overlapping shadings that may cause gradients to gently decay over many pixels.

Edge width may be calculated in any one of known methods. One method of calculating edge width is simply counting the number of pixels within an edge. An alternate method of calculating edge width is shown in FIG. 5. In FIG. 5, a first fractional pixel position (2.4) is found between a first outer pixel (pixel 3) of a refined edge and the adjacent outside pixel (pixel 2) by an interpolation from the refinement threshold 304. Likewise, a second fractional pixel position (5.5) is found between a second outer pixel (pixel 5) and its adjacent outside pixel (pixel 6). The edge width is found as the difference between these two fractional pixel positions, 5.5−2.4=3.1.

Slant Correction

Although each edge may be assigned to one prescribed direction (e.g. vertical direction or horizontal direction) or another, perpendicular, prescribed direction (e.g horizontal direction or vertical direction) and may have its edge width measured in a direction perpendicular to that assigned edge direction, the boundaries between regions of different image signal values in the image from which these edges arise may not be and usually are not aligned perfectly with either prescribed directions. In FIG. 6A, a boundary (shaded band) is shown to be inclined at a slant angle $\phi$ with respect to the vertical dashed line, and a width a is shown to be measured in the perpendicular direction (i.e. horizontal direction). However, a width b (as indicated in the drawing) measured in a direction perpendicular to the direction of the boundary (also direction of an edge that forms a part of the boundary) is more appropriate as the width of the boundary (and also of the edge) than width a. Such widths a that are not measured perpendicularly to the respective edge directions tend to be too large and do not represent the genuine thickness of the respective boundaries.

For purposes of calculating a focus signal from edge widths, the edge widths measured in one or the other of those prescribed directions are to be corrected by reducing them down to be widths in directions perpendicular to directions of the respective edges. The Edge Detection and Width Measurement Unit 206 performs such a correction on edge widths. As shown in FIG. 6A, the measured width a is the length of the hypotenuse of a right-angled triangle that has its base (marked with width b) straddling across the shaded boundary perpendicularly (thus perpendicular to the edge direction) and that has the angle $\phi$. The corrected width b may then be obtained from a projection of the measured width a to the direction perpendicular to the edge direction. From elementary trigonometry, such a projection may be given by $b=a\cos(\phi)$, but approximation may be used as long as it obtains accuracy to within 20%. The angle $\phi$, or $\cos(\phi)$ itself, may be found by any method known in the art for finding a direction of an edge in an image, or by a more accurate method described in the flowchart shown in FIG. 7.

Each horizontal or vertical edge's edge width may be corrected for its slant from either the horizontal or vertical orientation (the prescribed directions), respectively. FIG. 6A, 6B illustrate a correction calculation for an edge width measured in the horizontal direction for a boundary (and hence edges that form the boundary) that has a slant from the vertical line. FIG. 6C, 6D illustrate a correction calculation for an edge width measured in the vertical direction for a boundary (and hence edges that form the boundary) that has a slant from the horizontal line. The correction may be made by multiplying the edge width measured in a prescribed direction, such as a vertical direction or a horizontal direction, by a factor of cos φ, where φ is an angle of slant from the prescribed direction.

Figures 7, 8:
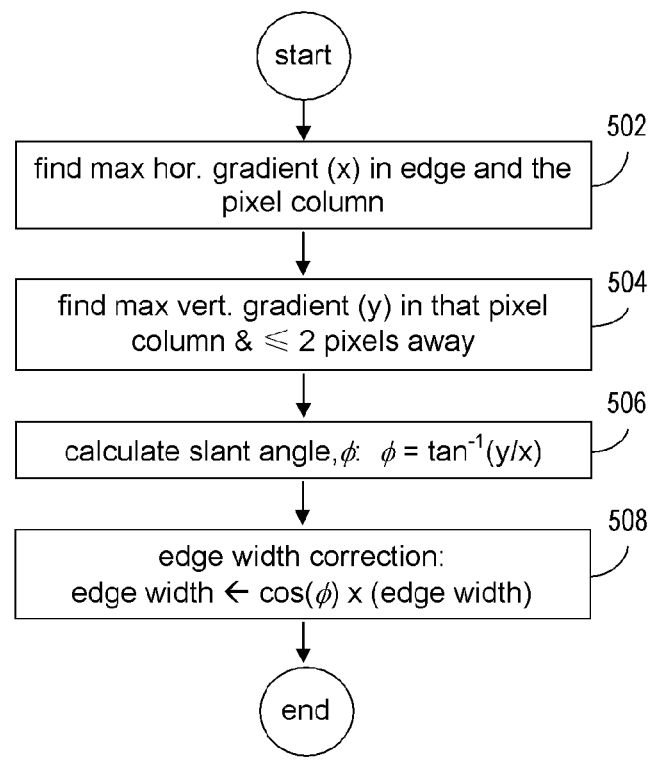
FIG. 7 is a flowchart of a process to calculate a slant angle φ and correct an edge width for a vertical edge having a slant.
FIG. 8 is an illustration of a vertical concatenated edge.

By way of example, FIG. 7 shows a flowchart of a process to correct edge widths for slant for edges inclined from a vertical line. (For horizontal edges, substitute 'row' for 'column', and interchange 'vertical' with 'horizontal' in the flowchart.)

From step 502 to step 506, a slant angle φ is found. For each vertical edge, at step 502, locate the column position where the horizontal gradient magnitude peaks, and find the horizontal gradient x. At step 504, find where the vertical gradient magnitude peaks along the column position and within two pixels away, and find the vertical gradient y.

At step 506, find the slant angle φ=$\tan^{-1}$ (y/x). At step 506, the slant angle may be found by looking up a lookup table. Although steps 502 to 506 present one specific procedure and method to find the slant angle, other procedures and methods known in the art may be used instead.

Finally, at step 508, scale down the edge width by multiplying with cos(φ), or with an approximation thereto as one skilled in the art usually does in practice.

A first modification of the process shown in FIG. 7 is to substitute for step 506 and part of step 508 by providing a lookup table that has entries for various combinations of input values of x and y. For each combination of input values of x and y, the lookup table returns an edge width correction factor. The edge width correction factor output by the lookup table may be an approximation to cos($\tan^{-1}$(y/x)) to within 20%, preferably within 5%. The edge width is then multiplied with this correction factor to produce a slant-corrected edge width.

A second modification is to calculate a quotient y/x between a vertical gradient y and a horizontal gradient x to produce a quotient q, then use q to input to a lookup table that has entries for various values of q. For each value of q, the lookup table returns an edge width correction factor. The edge width correction factor may be an approximation to cos ($\tan^{-1}$(q)) to within 20%, preferably within 5%.

For finding the slant angle φ (or an approximation thereto such that the correction factor is accurate to within 20%) and subsequently the correction factor cos(φ) (or an approximation thereto), or to directly find the correction factor without finding the slant angle φ (as in the first and second modifications), the values of x and y may be obtained in steps 502 to 506, but other methods may be employed instead.

A third modification is to perform the following for each one of a plurality of pixels in the edge: (a) find horizontal gradient x and vertical gradient y both for a pixel, (b) find q=y/x for this pixel, and (c) find a correction factor that corresponds to q, for instance cos ($\tan^{-1}$(q)) or an approximation thereto to within 20%. Finally, find the correction factor for the edge width by averaging across the correction factor from each of the plurality of pixels. The average may be a weighted average, such as one in which a pixel that has a larger horizontal gradient is given a larger weight than another pixel that has a lesser horizontal gradient.

Other modifications are possible along these directions or other.

Screen Threshold

Figure 9A:
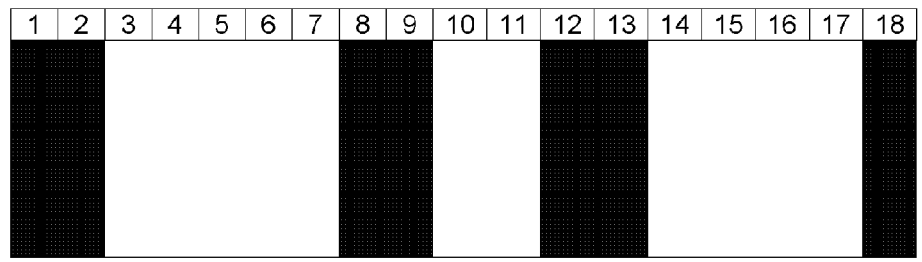
FIG. 9A is an illustration of a group of closely-packed vertical bars.
Figure 9B:
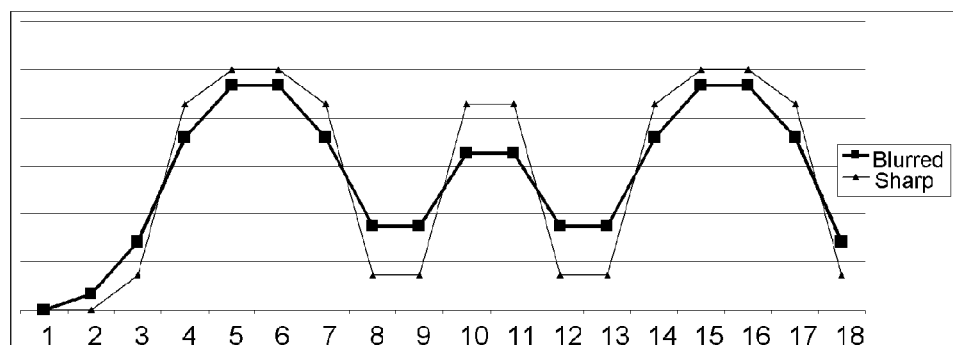
FIG. 9B is a graph of an image signal across FIG. 9A.
Figure 9C:
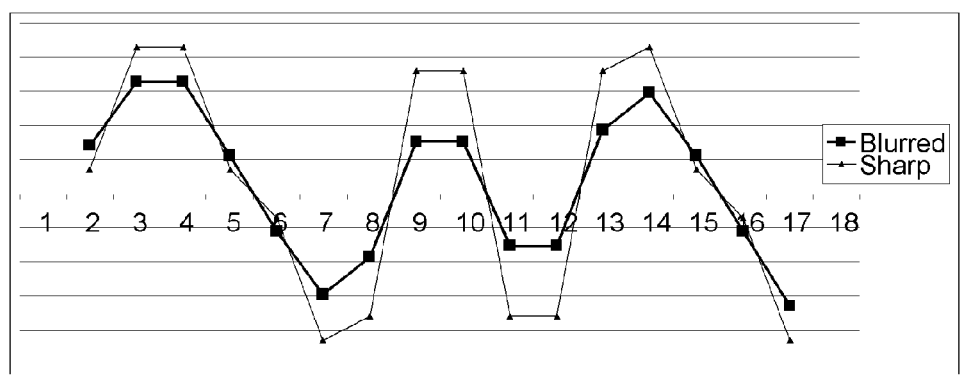
FIG. 9C is a graph of a horizontal Sobel gradient across FIG. 9A.

Adjacent edges may be prevented altogether from contributing to a focus signal, or have their contributions attenuated, if their peak gradient magnitudes are below a predetermined fraction of an adjacent wider edge's peak gradient magnitude. FIGS. 9A, 9B, and 9C illustrate a problem that is being addressed.

FIG. 9A illustrates three vertical white bars separated by two narrow black spaces each 2 pixels wide. The middle white bar is a narrow bar 2 pixels wide. FIG. 9B shows an image signal plotted horizontally across the image in FIG. 9A for each of a sharp image and a blurred image. FIG. 9C plots Sobel-x gradients of FIG. 9B for the sharp image and blurred image. In FIG. 9C, the first edge (pixels 2-5) for the blurred image is wider than that for the sharp image, and likewise the last edge (pixels 13-15) as expected. However, the two narrowest edges (pixels 9 & 10, and pixels 11 & 12) have widths of two in both images. In FIG. 9B, the corresponding slopes at pixels 9 & 10, and pixels 11 & 12, each takes two pixels to complete a transition. The blurred image, however, has a significant decline of peak gradient magnitude, as much as 50%, from the wider edge to the narrower edges. The sharp image, on the other hand, changes less than 10% between the wider and the narrower edges.

The significant decline, e.g. 20% or greater, in peak gradient magnitude for a narrower edge adjacent to a wider edge having an opposite-signed gradient gives a hint that the blurred image is not well focused, and thus the narrower edge should not be relied upon as an indication that the blurred image is sharp.

Likewise, mutually adjacent edges of alternating gradient polarities should not be relied upon for such indication even if their edge width are small as long as they are in close proximity to each other, e.g. no more than 1 pixel apart ("minimum edge gap"). The minimum edge gap is in terms of a number of pixels, e.g. 1, or 2, or in between.

Furthermore, given that one edge may have been eliminated due to having a peak gradient less than the elimination threshold, two successive edges having an identical gradient polarity and spaced no more than two times the minimum edge gap plus a sharp_edge_width (sharp_edge_width is a number assigned to designate an edge width of a sharp edge) apart may be used as a condition for eliminating or demoting a contribution from one or both of the two mutually adjacent edges. either.

The Edge Detection and Width Measurement Unit 206 may execute the following algorithm for eliminating closely-packed narrower edges based on a screen threshold established from a wider edge, and a modulation screen flag that can be turned on and off.

Figure 10:
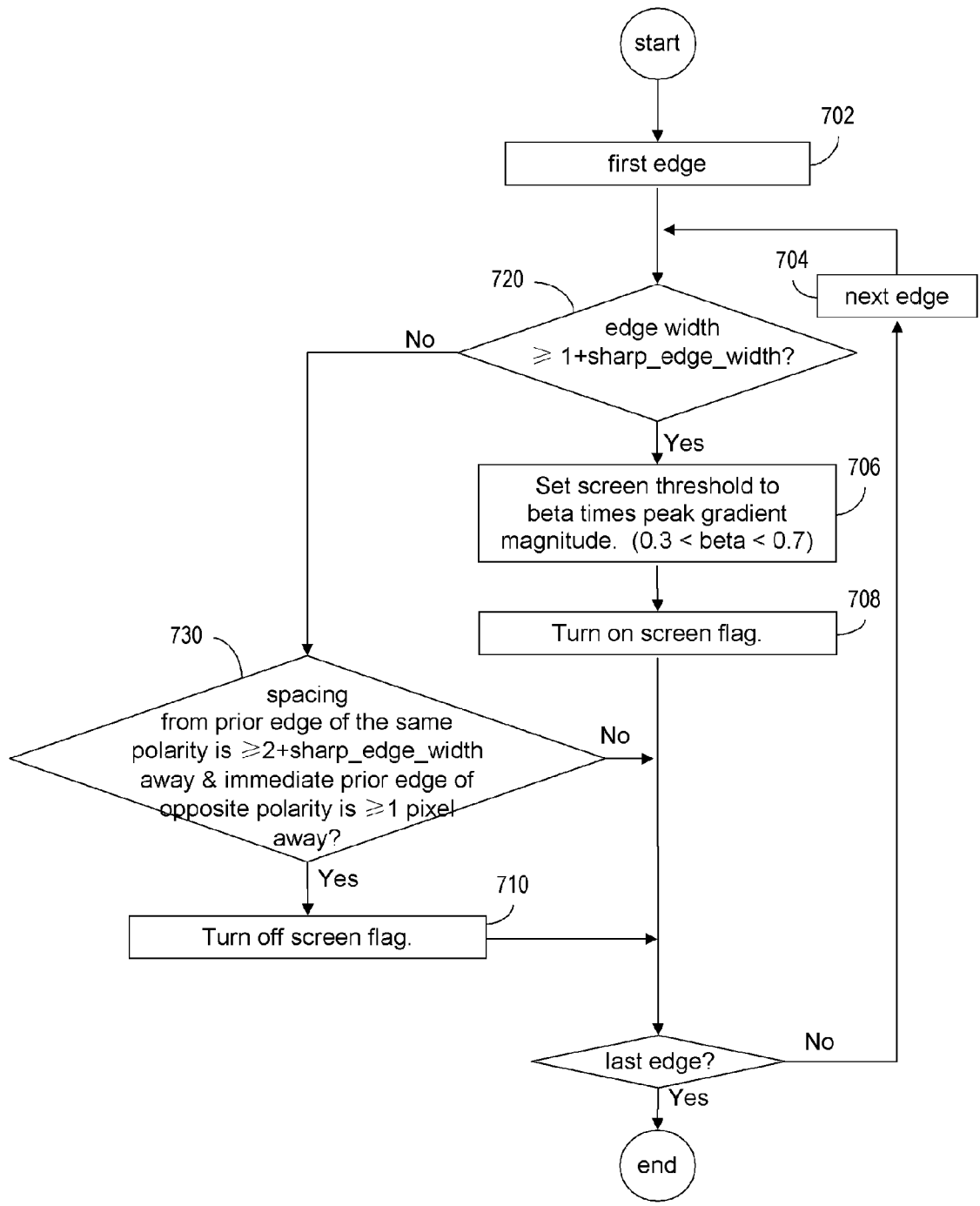
FIG. 10 is a flowchart of a process to eliminate closely-packed edges having shallow depths of modulation.

For each edge, the screen threshold and screen flag to be used for the immediate next edge of an opposite polarity are determined according to the process of the flowchart shown in FIG. 10.

Given the screen threshold and screen flag, an edge may be eliminated unless one of the following conditions is true: (a) the screen flag is off for this edge, (b) a peak gradient magnitude of the edge is not smaller than the screen threshold for this edge. To conditions (a) and (b) may be added condition (c) the edge width is not less than sharp_edge_width+1, where a number has been assigned for sharp_edge_width to designate an edge width of a sharp edge, and where the "+1" may be varied to set a range of edge widths above the sharp_edge_width within which edges may be eliminated if they fail (a) and (b). For the example shown in FIGS. 9A-9C, sharp_edge_width may be 2. FIG. 10 is a flowchart to determine a screen threshold and a screen flag for each edge. For vertical edges, assume scanning from left to right along a row, though this is not required. (For horizontal edges, assume scanning from top to bottom along a column, though this is not required.) A number is assigned for sharp_edge_width and may be 2 for the example shown in FIGS. 9A-9C. Starting at the first edge at step 702, each edge is queried at step 720 as to whether its edge width is greater than or equal to one plus sharp_edge_width, the value of one being the minimum edge gap value used for this illustration, but a different value may be used, such as between 0.5 and 2.0. If yes, the edge is a wider edge, and step 706 follows to set the screen threshold for the immediate next edge that has an opposite polarity to beta times a peak gradient magnitude of the edge, beta being from 0.3 to 0.7, preferably 0.55, then step 708 follows to turn on the screen flag for the next edge, then proceed to the next edge. If no, the edge is not a wider edge, and step 730 follows to check whether the spacing from the prior edge of the same gradient polarity is greater than two times the minimum edge gap (or a different predetermined number) plus sharp_edge_width and the immediate prior edge of an opposite polarity, if any, is more than the minimum edge gap away. If yes, step 710 follows to turn off the screen flag for the next edge. If no, keep the screen flag and the screen threshold for the next edge and proceed to the next edge. Beta may be a predetermined fraction, or it may be a fraction calculated following a predetermined formula, such as a function of an edge width. In the latter case, beta may vary from one part of the image to another part.

Gradient Peaking Template

Figure 23A:
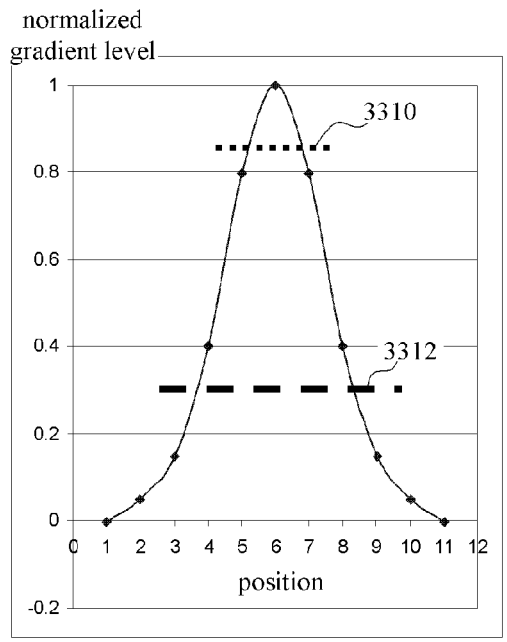
FIG. 23A illustrates a gradient of an image signal across an edge.
Figure 23B:
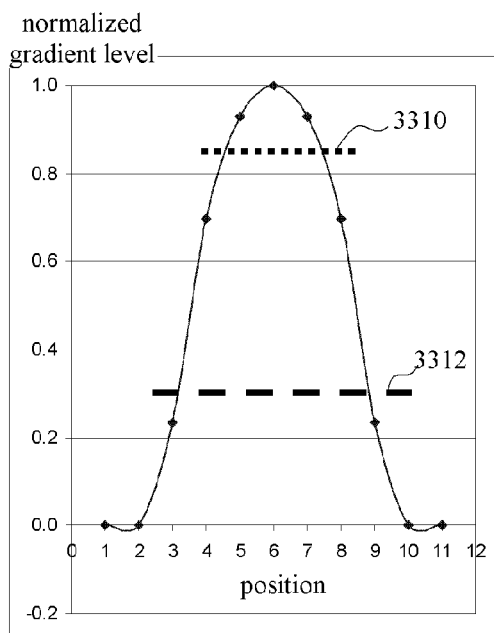
FIG. 23B illustrates a gradient of an image signal across a spurious edge.
Figure 23C:
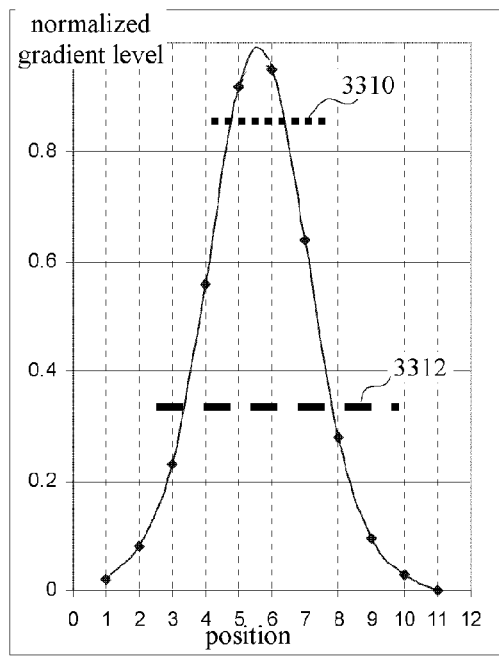
FIG. 23C illustrates a typical gradient profile whose peak is an interpolated peak.

FIG. 23A and FIG. 23B illustrate a method where the focus signal generator compares a gradient peaking template with a gradient profile about a peak. If a mismatch is detected, to the focus signal generator reduces or eliminates altogether an associated edge and its edge width from entering a calculation for a focus signal or edge count or focus control. FIG. 23A illustrates a gradient profile of an image signal across a genuine edge in the image signal, whereas FIG. 23B illustrates a gradient profile of an image signal across a spurious edge.

A gradient peaking template may be specified in terms of a function, e.g. a difference or a ratio, of a width of the peaking gradient profile at an upper gradient magnitude and a width at a lower gradient magnitude that constrains one by the other. By way of example, in FIG. 23A, and likewise in FIG. 23B, an upper gradient magnitude of 0.85 and a lower gradient magnitude of 0.3 are indicated with dotted and dashed lines, respectively. In FIG. 23A, the width of the gradient profile at the upper gradient magnitude is about 1.5 pixels, being the distance between the two positions where the interpolated gradient profile intersects the upper gradient level. At the lower gradient level, the gradient profile width is about 4.5 pixels. The difference between the two widths at the upper and lower gradient levels is 3.0 pixels. The ratio between the two widths at the upper and lower gradient levels is 1 to 3. On the other hand, in FIG. 23B, the widths are about 3.2 pixels and 5.5 pixels, respectively, giving a difference of 2.3 pixels and a ratio of 1 to 1.7, clearly much unlike the genuine gradient profile in FIG. 23A. To detect and disqualify spurious gradient profiles that do not represent genuine edges, such as one shown in FIG. 23B, a template may be specified as a constraint that the difference in the gradient profile's width between the upper and lower gradient levels shall lie between 2.5 and 3.5 pixels, or/and that the ratio shall lie between 1 to 2.6 and 1 to 3.45, failing which the edge associated with the peaking gradient profile may be rejected or de-emphasized. Thus, by using this template on the example spurious gradient profile of FIG. 23B, the edge associated with the peaking gradient profile in FIG. 23B is rejected or de-emphasized because neither the difference nor the ratio lie within the acceptance range of the constraints of the gradient peaking template.

Viewing it another way, the gradient peaking template's constraint stipulates that the width of a good gradient profile at a first gradient level is dependent on the width of the gradient profile at another gradient level, i.e. there is a definite relationship that constrains one by the other. Since the determination of width is done using interpolation, a certain tolerance is allowed for errors in determination of the widths. Thus the template may be expressed as $F(W_2) < W_1 < G(W_2)$ where $W_1$ is the width at a first gradient level and $W_2$ the width at a second gradient level, and $F(W_2)$ and $G(W_2)$ are functions of $W_2$ that expresses a minimum width constraint and a maximum width constraint on $W_1$ in terms of $W_2$.

Figure 23D:
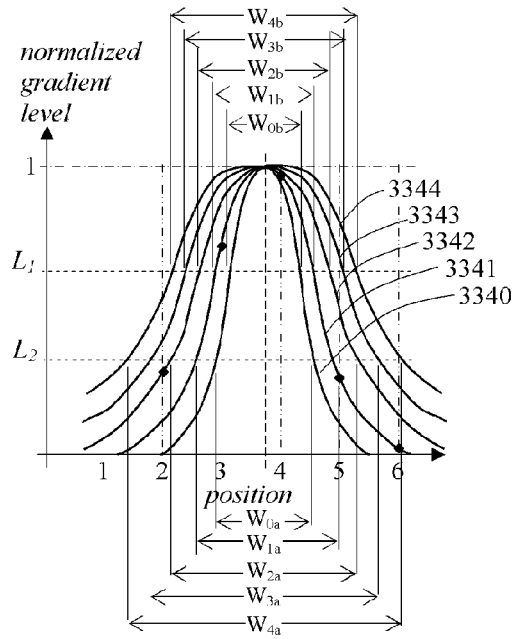
FIG. 23D illustrates five reference gradient profiles have different widths at one normalized gradient level that are proportional to their widths at another normalized gradient level.
Figure 24A:
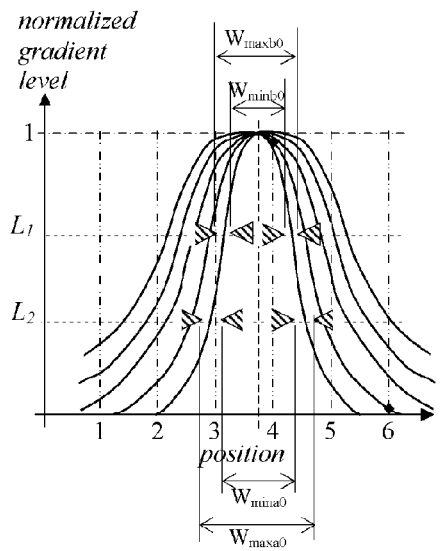
FIG. 24A shows first set of two pairs of min-max width constraints for the first and narrowest reference gradient profile.
Figure 24B:
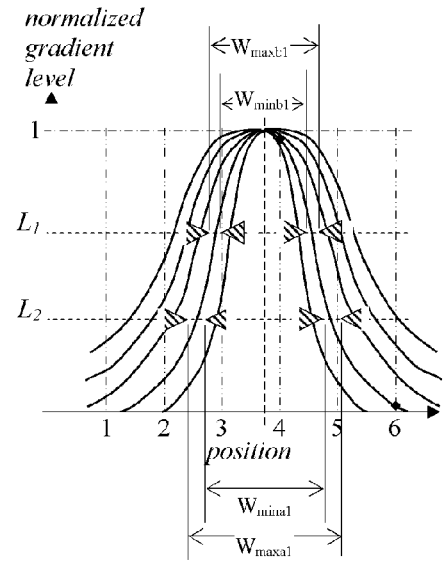
FIG. 24B shows second set of two pairs of min-max width constraints for the second and next wider reference gradient profile.
Figure 24C:
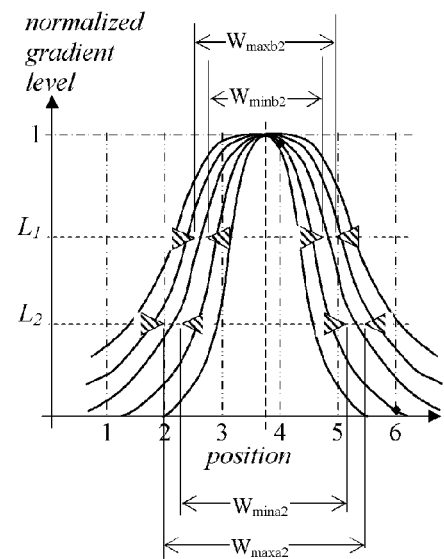
FIG. 24C shows third set of two pairs of min-max width constraints for a third reference gradient profile.
Figure 24D:
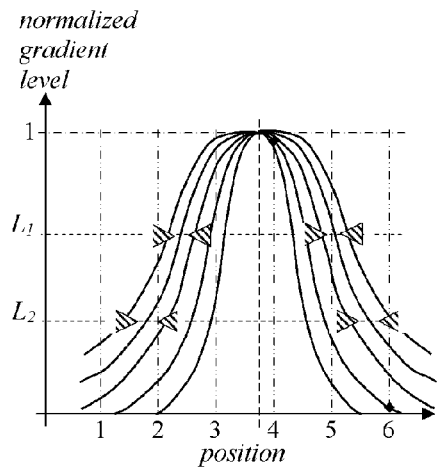
FIG. 24D shows fourth set of two pairs of min-max width constraints for a fourth reference gradient profile.
Figure 26:
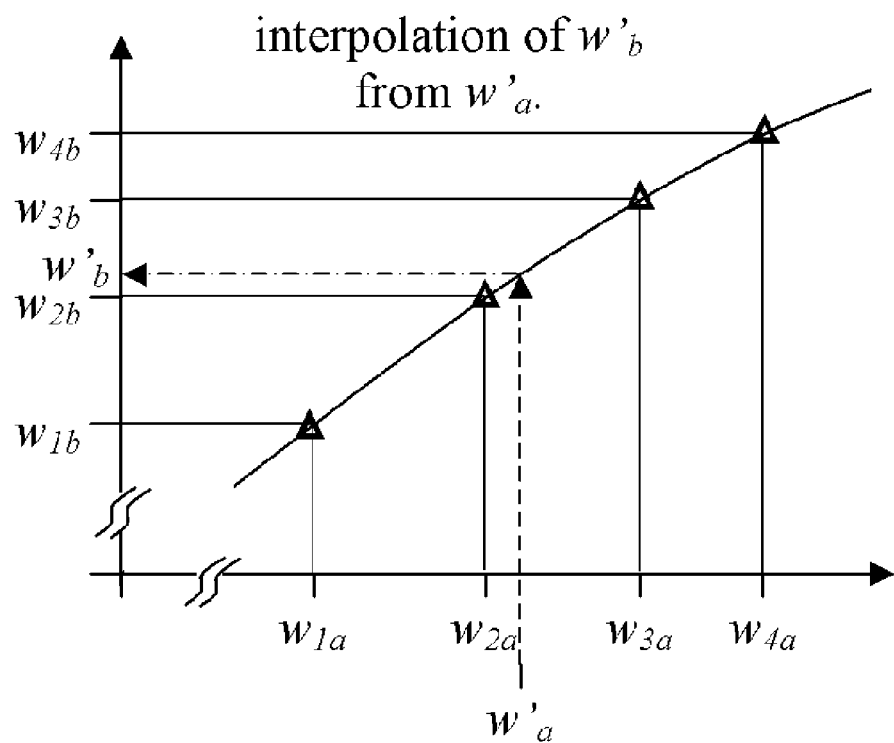
FIG. 26 shows an interpolation of a expected good gradient profile width at first gradient level from its width at a second gradient level based on widths of reference gradient profiles at these two different gradient levels.

The original of this constraint is explain with regards to FIG. 23D. In FIG. 23D, five good gradient profiles of different widths are shown, all normalized to peak gradient level of 1. $L_1$ and $L_2$ are two different gradient levels that slice through the gradient profiles. The gradient profiles have widths $W_{0a}$ to $W_{4a}$, from the smallest to the largest, at the lower gradient level $L_2$. Similarly, at the upper gradient level the widths follow the same order from $W_{0b}$ for the narrowest to $W_{4b}$ for the widest gradient profile. FIG. 26 shows their relationship, clearly the upper widths are proportional to the lower widths. The relationship is predictable and can be described by a simple function, such as a low degree polynomial, e.g. a second degree polynomial. Hence, given the lower width, the upper width can be found by multiplying the lower width with the function, which is dependent on the lower width, plus a tolerance to account for errors due to interpolation. In practice, the function may be implemented as a lookup table that stores a small number of lower widths (or upper widths) and the corresponding upper widths (or lower widths). To find an upper width that corresponds to a lower width $w'_a$, as shown in FIG. 26, an interpolation between three data points of $w_{1b}$, $w_{2a}$ and $w_{w3a}$ and their corresponding upper widths $w_{1b}$, $w_{2b}$, and $w_{w3b}$ will produce the desired value $w'_b$ of the corresponding upper width.

An alternate method to specify a gradient peaking template is to find a difference or ratio between the numbers of pixels above an upper gradient magnitude and those above a lower gradient magnitude, each gradient magnitude being at a certain upper fraction and lower fraction, respectively, from a peak (or interpolated peak) gradient magnitude. By way of example, in FIG. 23A, above the upper gradient magnitude of 0.85, there is one pixel, whereas above the lower gradient magnitude of 0.3 there are 5 pixels, giving a difference of 4 pixels and a ratio of 1 to 5. For FIG. 23B, on the other hand, 3 pixels are above the upper gradient magnitude and 5 pixels above the lower gradient magnitude, giving a difference of only 2 and a ratio of only 1 to 1.7. A template may be specified as a constraint that a difference shall lie between 3.5 and 4.5 pixels, or/and a ratio shall lie between 1 to 4 and 1 to 6, outside of which an edge associated with the peak may be rejected or de-emphasized. Thus, in this example, the edge associated with the gradient peaking in FIG. 23B is rejected or de-emphasized.

Two different templates may be specified for two different edge widths at a predetermined fraction of a peak gradient. For example, a gradient profile having a width of 6 at a gradient level at 50% of the peak gradient value may use a different template than another having a width of 3. The predetermined fraction can be a function of a width of the gradient profile.

Figure 25A:
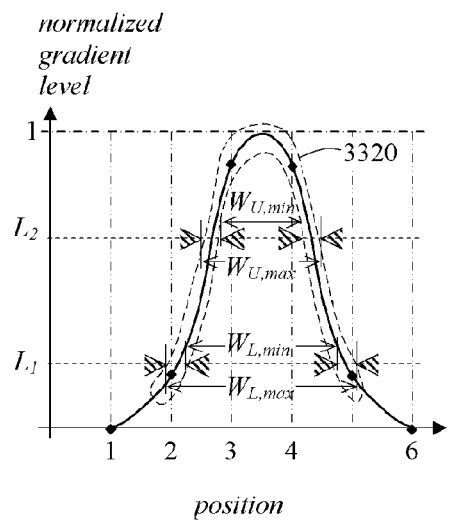
FIG. 25A illustrates a pair of min-max width constraints at a gradient level for selecting one of the reference gradient profiles and another pair of min-max width constraints at a different gradient level for detecting deviation from the selected reference gradient profile.
Figure 25B:
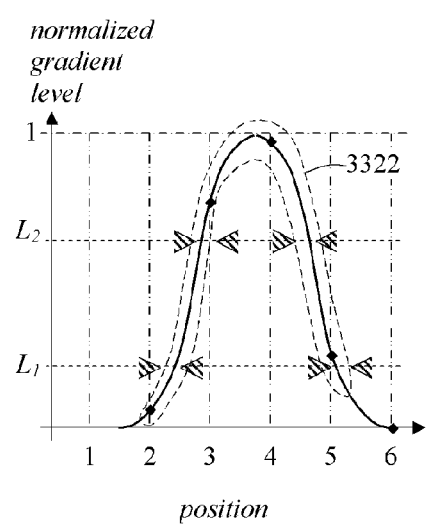
FIG. 25B illustrates the template of FIG. 25A is selected for a gradient profile due to fitting the minimal and maximal width constraints at one gradient level, and the gradient profile also passes both minimal and maximal width constraints at the other gradient level.
Figure 25C:
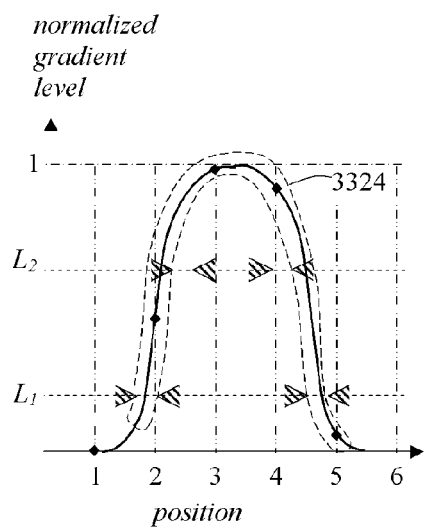
FIG. 25C illustrates the template of FIG. 25A is selected for a fat-top gradient profile of a spurious edge due to fitting the minimal and maximal width constraints at one gradient level, but the gradient profile violates the maximal width constraint at the other gradient level.
Figure 25D:
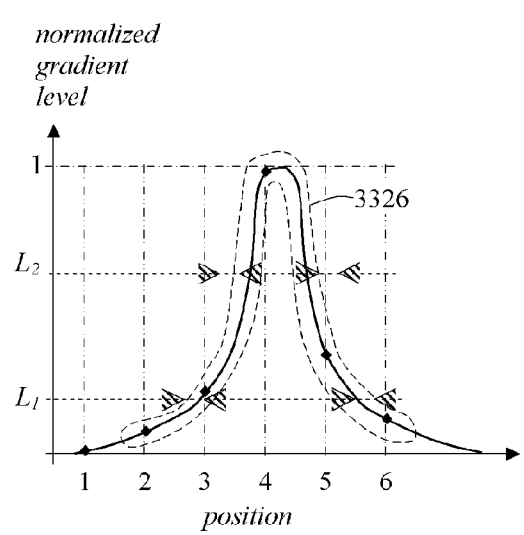
FIG. 25D illustrates the template of FIG. 25A is selected for a skinny-top spurious gradient profile due to fitting the minimal and maximal width constraints at one gradient level, but the gradient profile violates the minimal width constraint at the other gradient level.

FIGS. 24A to 24D illustrates an alternative method to implement such a constraint. In each of the figures is shown two pairs of maximum and minimum width constraints, one pair for the lower gradient level $L_1$, the other pair for the upper gradient level $L_2$. The sideway-pointing shaded triangles show the limits of the width constraints. For example, in FIG. 24A, at the lower gradient level $L_2$, the outer pair of inward pointing shaded triangles represents a constraint that width must not exceed $W_{maxa0}$, i.e. a max constraint, whereas the inner pair of outward pointing shaded triangles represents a constraint that width must not be less than $W_{min\alpha 0}$. For each set of two pairs of constraints, only one among the five reference gradient profiles shown can satisfy all constraints within the set. In FIGS. 25A to 25D, it is shown that each gradient profile being tested is assigned a set of constraints for which the gradient profile under test meets the max-min constraints at one of the two gradient level, say the lower gradient level $L_2$. Since there are only a limited number of sets available, this implies that the width of the gradient profile under test at the lower gradient level $L_2$ causes a particular pair of max-min constraint, that which is in the constraint set whose max-min constraints at the lower gradient level $L_2$ are satisfied by the gradient profile under test, to be brought to bear on the gradient profile to test its width at the upper gradient level $L_1$. In plain words, the gradient profile under test is required to satisfy a pair of max-min constraints at the upper gradient level $L_1$ based on the gradient profile's width at the lower gradient level $L_2$. Effectively, depending on the width at the lower gradient level $L_2$, different constraints are selected for the gradient profile under test for the upper gradient level $L_1$. It is seen here that in FIG. 25A, the gradient profile 3320 passes at the upper gradient level $L_1$. In FIG. 25B, the new gradient profile 3322 passes also. In FIG. 25C, however, the fat-top gradient profile 3324 of a spurious edge fails the max constraint at the upper gradient level $L_1$. In FIG. 52D, the skinny-top gradient profile 3326 of a spurious edge fails the min constraint.

It should be noted that, where edges have slants, as discussed earlier in this disclosure, edge width should be corrected for the slant for generating the focus signal, and a procedure was described to perform this correction to shrink the edge widths. Before applying the gradient profile under test to select a set of constraints, the width measured from the gradient profile may be corrected for a slant before performing the lookup-table lookup and interpolation shown in FIG. 26. For example, the measured width of the gradient profile at one of the gradient levels may be shrunken to correct for the slant, then used to lookup or to map to the width at the other gradient level. On the other hand, the width found from the lookup for the other gradient level needs to go through the reverse of slant correction to give a width for the slanted edge. In other words, it needs to be scaled back up using the reciprocal of the correction factor for slant correction. Equivalently and alternatively, the widths from the lookup table can be scaled up for the lookup.

The above detection of spurious edges and solution for spurious edges may be performed in the Edge Detection & Width Measurement Unit 206.

Length Filter

Below describes a function of length filter 212. Broadly defined, length filter 212 creates a preference for edges that each connects to one or more edges of a similar orientation. A group of edges that are similarly oriented and mutually connected within the group ("concatenated edge") is less likely to be due to noise, compared with an isolated edge that does not touch any other edge of similar orientation. The more edges of a similar orientation thus concatenated together, the lesser the chance of them being due to noise. The probability of the group being due to noise falls off exponentially as the number of edges within the group increases, and far faster than linearly. This property can be harnessed to reject noise, especially under dim-lit or short-exposure situations where the signal-to-noise ratio is weak, e.g. less than 10, within the image or within the region of interest. The preference may be implemented in any reasonable method to express such preference. The several ways described below are merely examples.

A first method is to eliminate edges that belong to vertical/horizontal concatenated edges having lengths lesser than a concatenated length threshold. The concatenated length threshold may be larger when the region of interest is dimmer. For example, the concatenated length threshold may start as small as 2, but increases to 8 as a signal-to-noise ratio within the region of interest drops to 5. The concatenated length threshold may be provided by the processor 112, 112', 112", for example through a 'length command' signal, shown in FIG. 3, as part of signals 132. Alternately, the threshold may be calculated according to a formula on the focus signal generator.

A second method is to provide a length-weight in the length filter 212 for each edge and apply the length-weight to a calculation of focus signal in the focus signal calculator 210. An edge that is part of a longer concatenated edge receives a larger weight than one that is part of a shorter concatenated edge. For example, the length-weight may be a square of the length of the concatenated edge. Thus, a contribution of each edge towards the focus signal may be multiplied by a factor A/B before summing all contributions to form the focus signal, where B is a sum of the length-weights of all edges that enter the focus signal calculation, and A is a length-weight of the edge. Likewise, the edge-width histogram, which may be output as part of signals 134, may have edges that are members of longer concatenated edges contribute more to the bins corresponding to their respective edge width, thus preferred, instead of all edges contribute the same amount, e.g. +1. Thus, for example, each edge may contribute A/C, where C is an average value of A across the edges. Similarly, the narrow-edge count may have edges that are members to longer concatenated edges contribute more. Thus, for example, the contribution from each edge may be multiplied by A/D, where D is an average of A among edges that are counted in the narrow-edge count.

A group of N vertical (horizontal) edges where, with the exception of the top (leftmost) and the bottom (rightmost) ones, each edge touches two other vertical (horizontal) edges, one above (to the left of) itself, the other below (to the right of) itself, is a vertical (horizontal) concatenated edge of length N. The top (leftmost) edge needs only touch one edge below (to the right of) itself. The bottom (rightmost) edge needs only touch one edge above (to the left of) itself.

FIG. 8 illustrates a vertical concatenated edge and its length. In FIG. 8, cells R2C3 and R2C4 form a first vertical edge, cells R3C3, R3C4, and R3C5 together form a second vertical edge, and cells R4C4 and R4C5 together form a third vertical edge. The first and the third vertical edges each touches only one other vertical edge, whereas the second vertical edge touches two other vertical edges. The first, second and third vertical edges together form a vertical concatenated edge having a length of 3.

In a situation (not shown) where a vertical (horizontal) concatenated edge has two or more branches, i.e. having two edges in a row (column), the length may be defined as the total number of edges within the concatenated edge. Alternately, the length may be defined as the vertical (horizontal) distance from a topmost (leftmost) edge therein to a bottommost (rightmost) edge therein plus one.

There are other possible ways to define a concatenated length other than the above proposals. For example, a definition of a length for a concatenated edge shall have a property that the length is proportional to the number of member edges within the concatenated edge at least up to three. This is to be consistent with the previously stated reasoning that more edges being mutually connected by touching each other exponentially reduces a probability that the concatenated edge is caused by a noise, and as such the length should express a proportionality to the number of member edges within the concatenated edge up to a reasonable number that sufficiently enhances a confidence in the concatenated edge beyond that for a single member. The length filter 212 may de-emphasize or eliminate and thus, broadly speaking, discriminate against an edge having a concatenated length of one. The length filter 212 may discriminate against an edge having a concatenated length of two. The length filter 212 may discriminate against an edge having a concatenated length of three, to further reduce an influence of noise. The length filter 212 may do any one of these actions under a command from the processor.

Although shown in FIG. 3 to immediately follow the Edge Detection & Width Measurement Unit 206, other arrangements are possible. For example, the Length Filter 212 may be inserted before the focus signal calculator 210, wherein the edges processed by the Length Filter 212 are those that pass through the width filter 209 depending on the 'fine' signal.

In an alternate embodiment of a focus signal generator, the fine switch 220 may be removed so that the focus signal calculation unit 210 receives a first set of data not filtered by the width filter 209 and a second set filtered, and for each calculates a different focus signal, gross focus signal for the former, fine focus signal for the latter, and outputs both to the processor 112, 112'.

Width Filter

Figure 11:
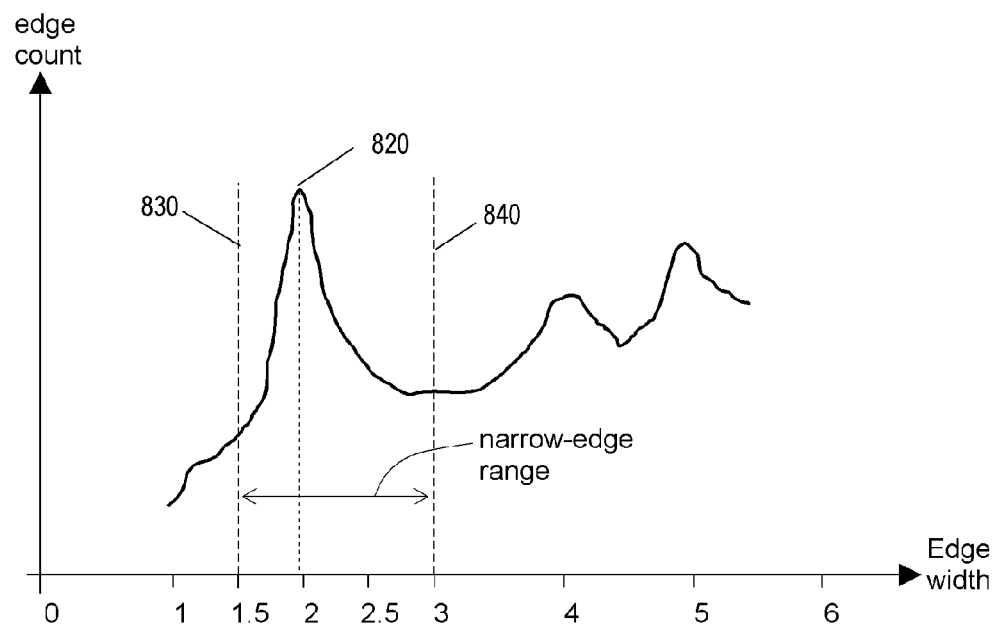
FIG. 11 is a histogram of edge widths illustrating a range of edge widths for calculating a fine focus signal.

Refer next to FIG. 3 to understand an operation of the Width Filter 209. FIG. 11 plots a histogram of edge widths, i.e. a graph of edge counts against edge widths. At edge width of 2, i.e. the aforementioned sharp_edge_width, there is a peak, indicating a presence of sharp edges in the image. At edge widths of 4 and 5, however, there are peaks, indicating edges that are blurred, possibly due to the corresponding imaged objects being out of focus, being at a different distance away from the focus lens than those objects that give rise to the sharp edges. For calculating a focus signal, edges whose widths lie outside a predetermined range ("narrow-edge range") may be de-emphasized using the Width Filter 209. The Width Filter 209 may create a lesser weight for edge widths outside the narrow-edge range for use in the focus signal calculation. For example, edge widths may be assigned weight of 1.0, whereas edges widths more than +1 to the right of the upper limit 840 assigned a weight of 0, and edge widths in between assigned weights between 0 and 1.0, falling monotonically with edge width. Alternately, the Width Filter 209 may prevent such edges from entering the focus signal calculation altogether. Appropriate upper and lower limits 830, 840 depend on several factors, including crosstalk in the pixel array 108, the interpolation method used to generate missing colors for the image received by the focus signal generator 120, and the filter coefficients used in the lowpass filter employed in the Edge Detection and Width Measurement Unit 206. Appropriate upper and lower limits 830, 840 and the parameter sharp_edge_width may be determined for the image pickup apparatus 102, 102' by capturing images of various degrees of sharpness and inspecting the edge width histograms. For example, if a sharp image has a peak at edge width of 2, an appropriate lower and upper limit may be 1.5 and 3, respectively, and the sharp_edge_width may be set to 2.0. The lower and upper limits and sharp_edge_width may be determined as above and provided to the focus signal generator 120, 120', 120" by the processor 112, 112". When 'fine command' is ON, the fine focus signal thus calculated de-emphasizes edge widths outside the narrow-edge range.

In addition, the Width Filter 209 may calculate a total count of the edges whose edge widths fall within the narrow-edge range and output as part of output signals 134. Narrow-Edge Count may be input to and used by the focus system controller (processor 112) to detect a presence of sharp image and/or for initiating tracking.

Focus Signal

Referring next to the focus signal calculator 210 of FIG. 3, the focus signal calculator 210 receives edge widths and outputs a focus signal. The focus signal may be calculated as a weighted average of all the edge widths where the weights are the edge counts for each edge width, viz. focus signal=$\Sigma w_i e_i / \Sigma w_i$, where $e_i$ are the edge widths, $w_i$ are the weights, where here $w_i = c_i$, $c_i$ being the edge count at edge width $e_i$, i being a bin number of a histogram of edge widths. Alternately, the weight at each edge width may be the edge count for the edge width multiplied by the edge width itself, i.e. $w_i = c_i e_i$. In addition, preferences from the Width Filter 209 that are expressed in terms of weights may be further multiplied to each edge width. For example, for weights $\Omega_i$ produced by the Width Filter 209, $\Sigma \Omega_i = 1$, focus signal may be calculated as $\Sigma \Omega_i w_i e_i / \Sigma \Omega_i w_i$. If control signal 'fine' is ON and 'exclude' is OFF, the focus signal would be a value very close to the sharp edge width of 2.0 for the example shown in FIG. 11, indicating that among object details within the focus distance range that would produce edge widths between 2.0 and 3.0, most are actually in sharp focus. If control signal 'fine' is OFF and 'exclude' is OFF, the focus signal may be a value close to 5.0, indicating that there are substantial details of the image that are out of focus. Turning ON the fine switch 220 allows the focus signal to respond more to objects slightly blurred while less to those that are completely blurred. When the fine switch 220 is ON, we shall refer to the focus signal as a fine focus signal, whereas when the fine switch 220 is OFF, a gross focus signal. As aforementioned, the emphasis expressed by the Length Filter 212 may be incorporated into the focus signal in one of several ways, such as eliminating an edge that is de-emphasized from entering the focus signal calculation, or reducing a weight of the edge's contribution towards a count $e_i$ of a corresponding edge width bin.

Figure 15:
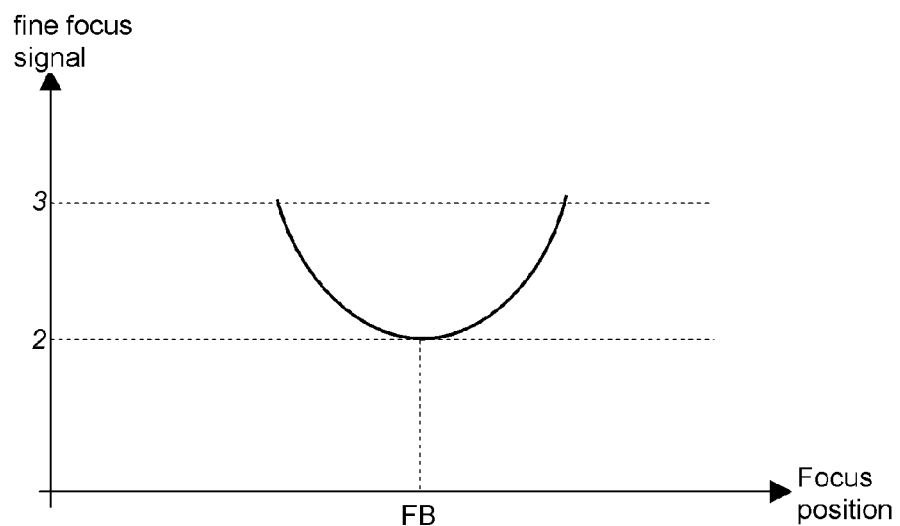
FIG. 15 is a graph illustrating a variation of a fine focus signal across a range of focus positions.

FIG. 15 sketches a response of the fine focus signal to an adjustment of the focus position in the vicinity of where an object is in sharp focus. The fine focus signal reaches a minimum value, approximately at sharp_edge_width, where the focus position brings an image into sharp focus, and increases if otherwise. The fine focus signal may be used for tracking objects already in-focus or very nearly so. For moving objects, the fine focus signal allows the focus control system to keep the objects in sharp focus even if the focus distance continues to change. Fine focus signal may also be used to acquire a sharp focus ("acquisition") of an object that is not yet in sharp focus but close enough such that the object gives rise to edges whose widths fall within the narrow-edge range. Since the edge width histogram exhibits a peak at the edge width corresponding to the object away from the sharp_edge_width, resulting in the fine focus signal being larger than the sharp_edge_width, the focus control system may respond by adjusting the focus position to bring the fine focus signal value towards the sharp_edge_width, thus centering the peak of edge width due to the object at the edge width value equal to sharp_edge_width.

Basic Use

FIGS. 12-16 illustrate how the narrow-edge count, gross focus signal, and fine focus signal may be used to perform focus control to achieve sharp images.

Figure 12:
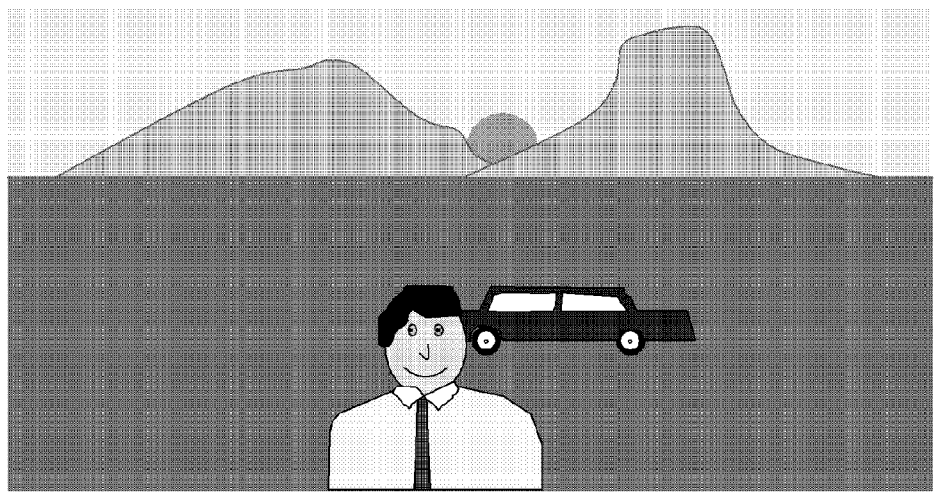
FIG. 12 is an illustration of a scene.

FIG. 12 illustrates an outdoor scene having 3 groups of objects at different focus distances: "person" in the foreground, "mountain, sun, and horizon" in the background, and "car" in the between.

Figure 13:
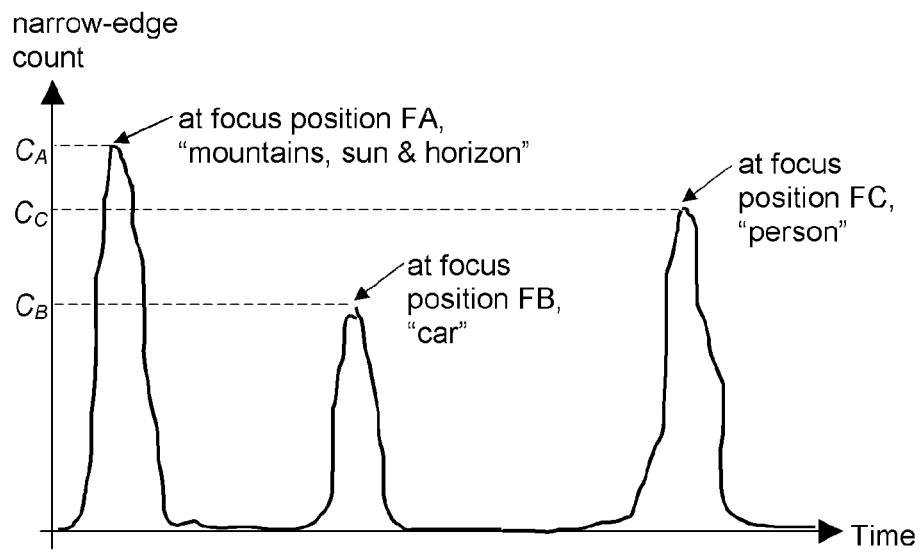
FIG. 13 is a graph illustrating a variation of a narrow-edge count during a focus scan of the scene of FIG. 12.

FIG. 13 is an illustration of the narrow-edge count plotted against time when the focus position of the focus lens 104 sweeps from far to near for the scene illustrated in FIG. 12. The narrow-edge count peaks when the focus position brings an object into a sharp image on the pixel array 108. Thus the narrow-edge count plot exhibits 3 peaks, one each for "mountain, sun, and horizon", "car", and "person", in this order, during the sweep.

Figure 14:
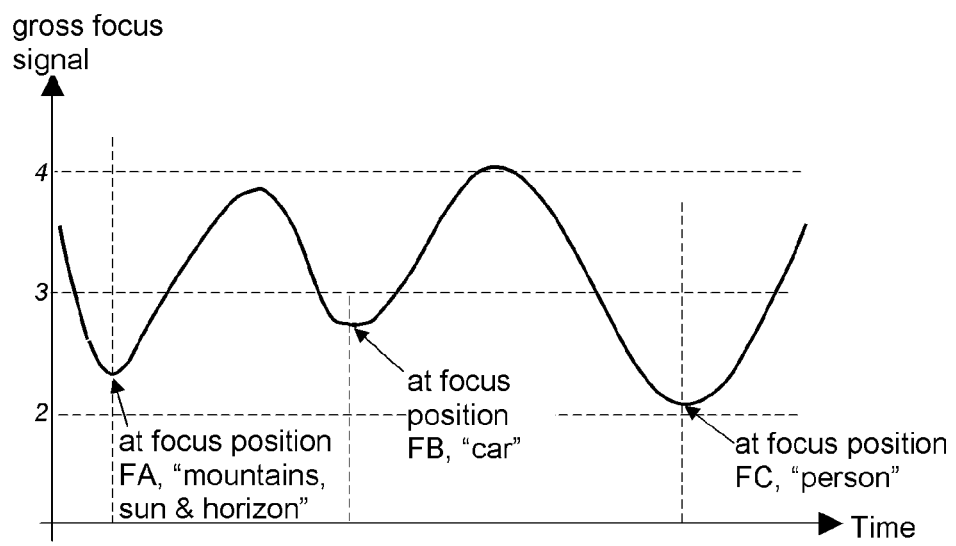
FIG. 14 is a graph illustrating a variation of a gross focus signal during a focus scan of the scene of FIG. 12.

FIG. 14 shows the gross focus signal plotted against time. The gross focus signal exhibits a minimum when the focus position is near each of the 3 focus positions where the narrow-edge count peaks. However, at each minimum, the gross focus signal is not at the sharp edge width level, which is 2.0 in this example, due to bigger edge widths contributed by the other objects that are out-of-focus.

FIG. 15 illustrates the fine focus signal plotted against the focus position in the vicinity of the sharp focus position for "car" in the scene of FIG. 12. The fine focus signal achieves essentially the sharp edge width, which is 2 in this example, despite the presence of blurred objects ("person" and "mountains, sun, and horizon"). Referring to FIG. 11 again, where two peaks at widths of 4 and 5 are contributed by those two groups of blurred objects, this can be understood as the Width Filter 324 having reduced the weight or eliminated altogether the contributions from the edge widths to the right of upper-limit 840.

A focus control system may use the gross focus signal to search for the nearest sharp focus position in a search mode. It can move the focus position away from the current focus position to determine whether the gross focus signal increases or decreases. For example, if the gross focus signal increases (decreases) when the focus position moves inwards (outwards), there is a sharp focus position farther from the current focus position. The processor 112, 112', 112" can then provide a focus drive signal to move the focus lens 104 in the direction towards the adjacent sharp focus position.

A focus control system may use the fine focus signal to track an object already in sharp focus to maintain the corresponding image sharp (thus a "tracking mode") despite changes in the scene, movement of the object, or movement of the image pickup apparatus. When an object is in sharp focus, the fine focus signal level is stable despite such changes. Hence a change in the fine focus signal suggests a change in focus distance of the object from the image pickup apparatus. By "locking" the focus control system to a given fine focus signal level near the minimum, for example between 2.0 to 2.5 in this example, in particular 2.1, any shift in the fine focus signal level immediately informs the processor 112, 112', 112" of a change in the focus distance of the object. The processor 112, 112', 112" can then determine a direction and cause the focus lens 104 to move to bring the fine focus signal level back to the "locked" level. Thus the image pickup apparatus 102, 103, 103', 103" is able to track a moving object.

A focus control system, e.g. as implemented in algorithm in processor 112, 112', 112", may use narrow-edge count to trigger a change from a search mode to a tracking mode. In the tracking mode, the focus control system uses the fine focus signal to "lock" the object. Before the focus position is sufficiently near the sharp focus position for the object, the focus control system may use the gross focus signal to identify the direction to move and regulate the speed of movement of the lens. When a object is coming into sharp focus, narrow-edge count peaks sharply. The processor 112, 112', 112" may switch into the tracking mode and use the fine focus signal for focus position control upon detection of a sharp rise in the narrow-edge count or a peaking or both. A threshold, which may be different for each different sharp focus position, may be assigned to each group of objects found from an end-to-end focus position "scan", and subsequently when the narrow-edge count surpasses this threshold the corresponding group of objects is detected. For a stationary scene, e.g. for still image taking, an end-to-end focus position scan can return a list of maximum counts, one maximum count for each peaking of the narrow-edge count. A list of thresholds may be generated from the list of maximum counts, for example by taking 50% of the maximum counts.

Figure 16:
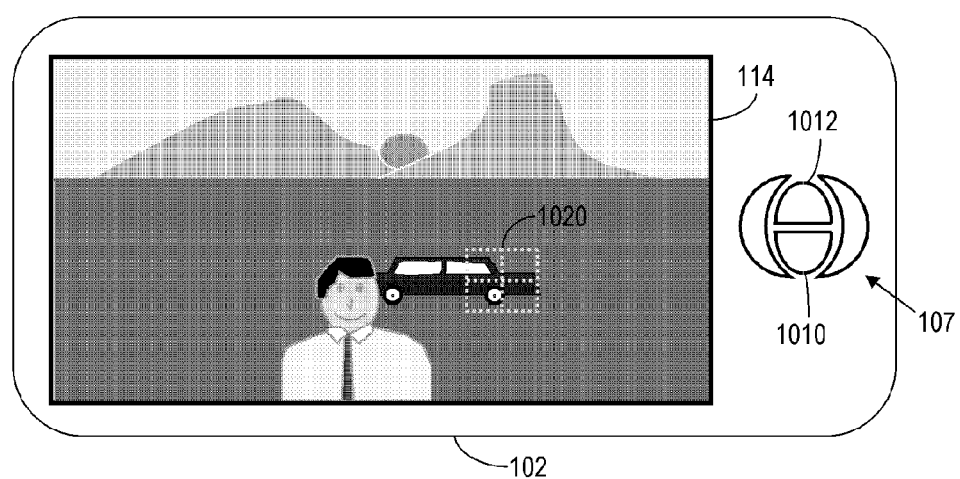
FIG. 16 is an illustration of an apparatus displaying multiple objects in a scene and a selection mark over one of the objects.
Figure 17:
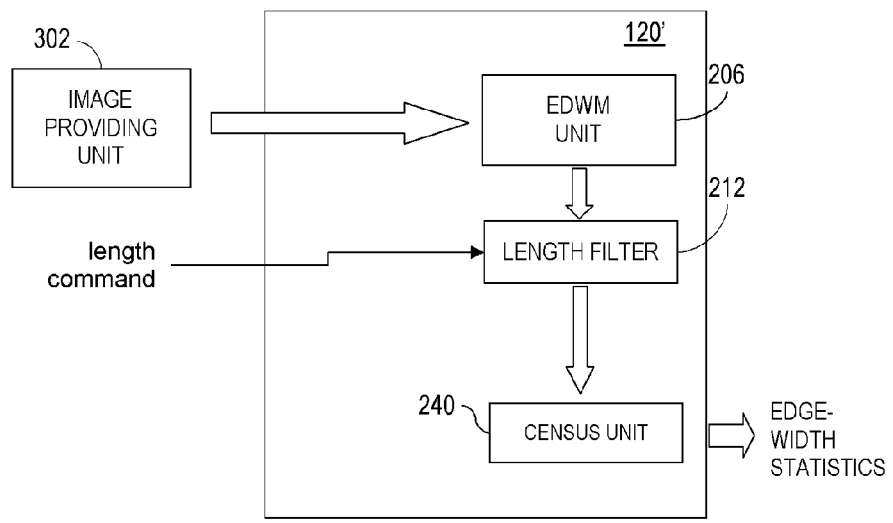
FIG. 17 is a block diagram of an alternate embodiment of a focus signal generator.
Figure 18:
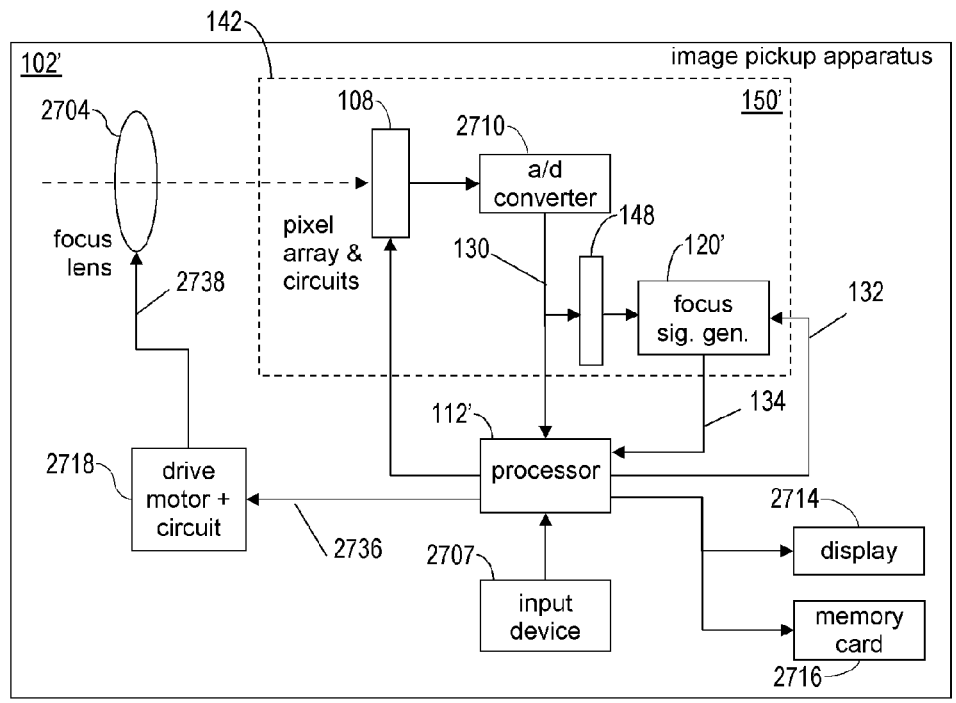
FIG. 18 is a schematic of an alternate embodiment of an auto-focus image pickup apparatus.

FIG. 16 illustrates an image pickup apparatus 102 having a display 114, an input device 107 comprising buttons, and selection marker 1920 highlighted in the display 114. A user can create, shape and maneuver the selection marker 1920 using input device 107. Although shown in this example to comprise buttons, input device 107 may comprise a touch-screen overlaying the display 114 to detect positions of touches or strokes on the display 114. Input device 107 and processor 112, 112', 112" or a separate dedicated controller (not shown) for the input device 107 may determine the selection region. The parameters for describing the selection region may be transmitted to the focus signal generator 120, 120', 120" over bus 132 (or internally within the processor 112 in the case where focus signal generator 120 is part of the processor 112). In response, the focus signal generator 120 may limit the focus signal calculation or the narrow-edge count or both to edges within the selection region described by said parameters or de-emphasize edges outside the selection region. Doing so can de-emphasize unintended objects from the focus signal and then even the gross focus signal will exhibit a single minimum and a minimum level within 1.0 or less of the sharp edge width.

Alternate Embodiments

FIG. 45 shows an alternate embodiment of a focus signal generator 120'. Focus signal generator 120' outputs statistics of edges and edge widths. Among the edge-width statistics that controller 120' outputs may be one or more of the following: an edge-width histogram comprising edge counts at different edge widths; an edge width where edge width count reaches maximum; a set of coefficients representing a spline function that approximates edge counts at different edge widths; and any data that can represent a function of edge width. Census Unit 240 may receive data computed in one or more of the other units with the focus signal generator 120' to calculate statistics of edge widths. In general, the focus signal generator 120' may output a signal that has an indication of a distribution of edge widths.

Figure 19:
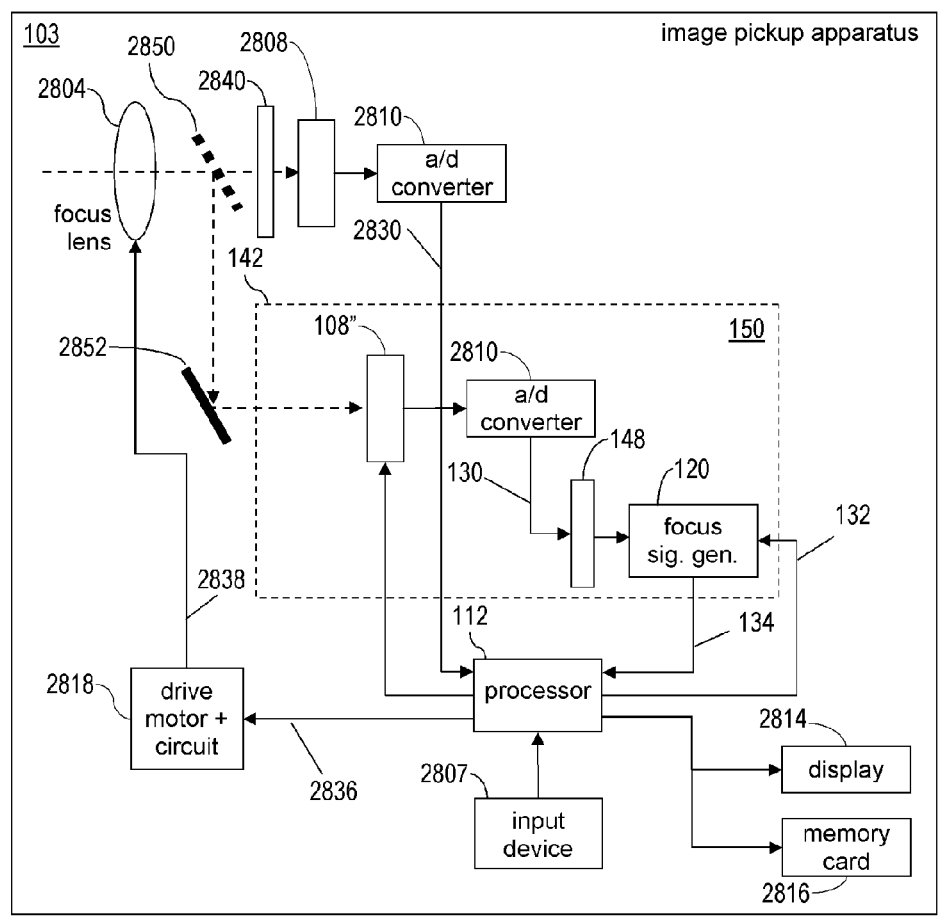
FIG. 19 is a schematic of an embodiment of an auto-focus image pickup apparatus having a main pixel array and an auxiliary pixel array.
Figure 20:
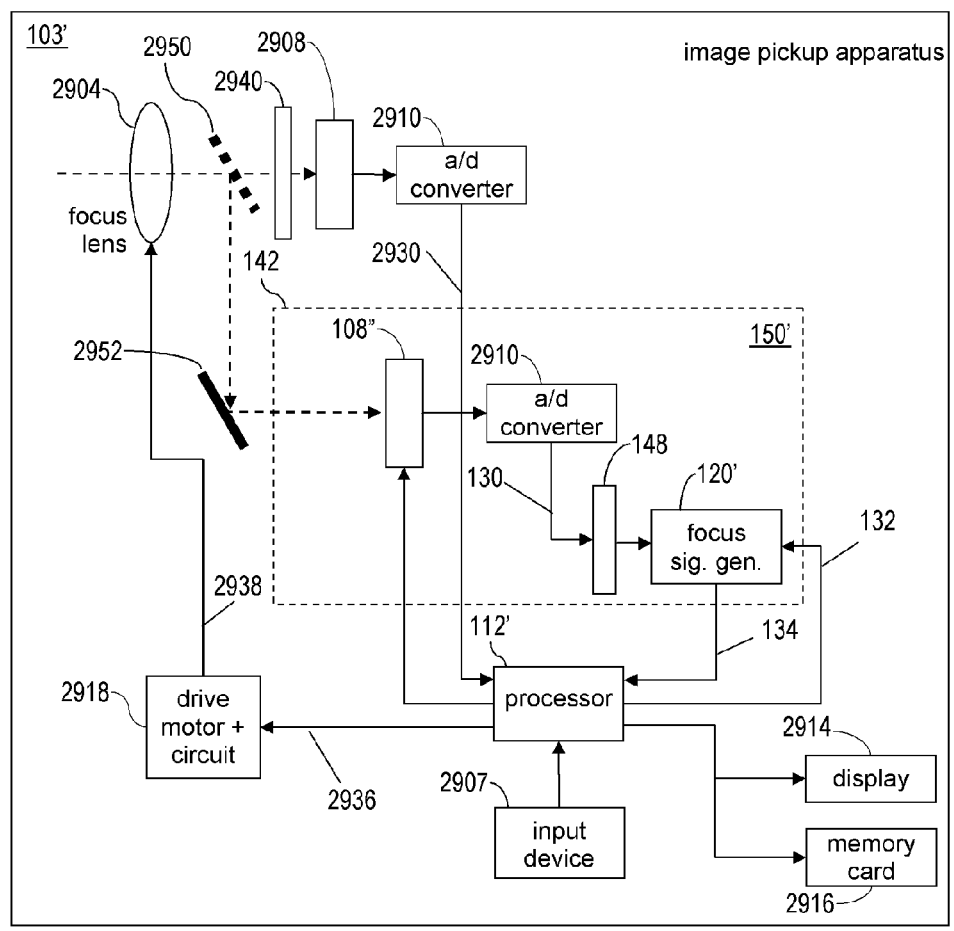
FIG. 20 is a schematic of an alternate embodiment of an auto-focus image pickup apparatus having a main pixel array and an auxiliary pixel array.
Figure 21:
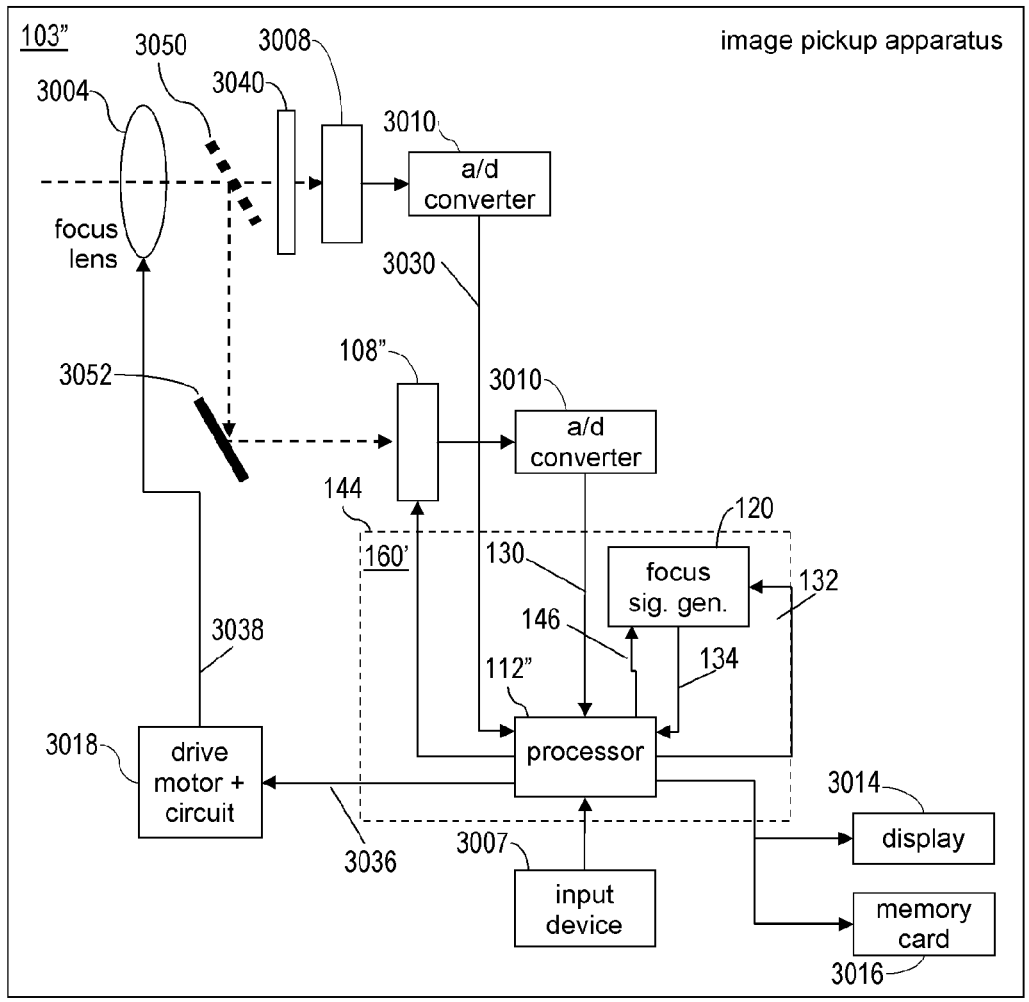
FIG. 21 is a schematic of an alternate embodiment of an auto-focus image pickup apparatus having a main pixel array and an auxiliary pixel array.
Figure 22:
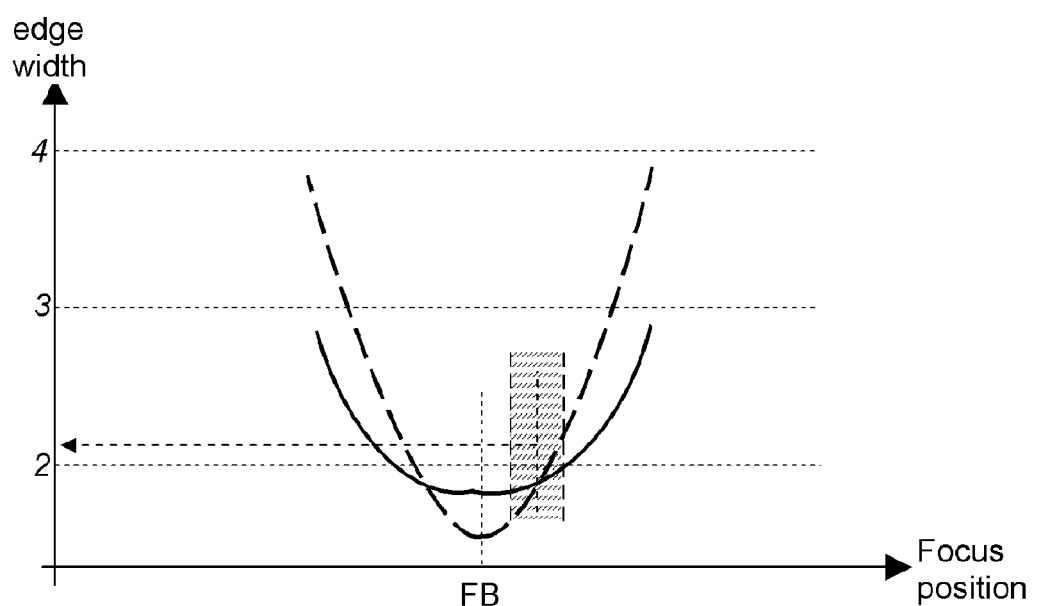
FIG. 22 is an illustration of a variation of an edge width from a main pixel array and a variation of an edge width from an auxiliary pixel array at different focus positions.

Referring to FIG. 46, the edge-width statistics thus provided in signals 134 to an alternate embodiment of processor 112' in an alternate auto-focus image pickup apparatus 102' may be used by the processor 112' to compute a gross and/or fine focus signal and a narrow-edge count in accordance with methods discussed above or equivalent thereof. In addition, any data computed in the focus signal generator 120' may be output to the processor 112' as part of the output signals 134. For example, the exclusion ranges and chains, along with statistics of edges, such as statistics of edge characteristics used for calculating the exclusion ranges and chains according to the flowcharts of FIG. 19 or FIG. 20, may be sent to the processor 112'.

The processor 112' may internally generate a focus signal and/or a narrow-edge count in addition to the functions included in the processor 112 of FIG. 1.

The pixel array 108, A/D Converter 110, color interpolator 148, and generator 120' may reside within a package 142, together comprising an image sensor 150', separate from the processor 112'.

Yet another embodiment of a focus signal generator may add a census unit 240 to the generator 102 of FIG. 1 and output one or more statistics calculated in such a generator to the processor 112.

Auxiliary Pixel Array

FIG. 47 shows an alternate embodiment of an auto-focus image pickup system 103. In addition to elements included in a system 102, the system 103 may include a partial mirror 2850, a full mirror 2852, an optical lowpass filter 2840, a main pixel array 2808, and a main A/D Converter 2810. The partial mirror 2850 may split the incoming light beam into a first split beam and a second split beam, one transmitted, the other reflected. The first split beam may further pass through the optical lowpass filter 2840 before finally reaching the main pixel array 2808, which detects the first split beam and converts to analog signals. The second split beam may be reflected by the full mirror 2852 before finally reaching the auxiliary pixel array 108", which corresponds to the pixel array 108 in system 102 shown in FIG. 1. The ratio of light intensity of the first beam to the second beam may be 1-to-1 or greater than 1-to-1. For example, the ratio may be 4-to-1.

The main pixel array 2808 may be covered by a color filter array of a color mosaic pattern, e.g. the Bayer pattern. The optical lowpass filter 2808 prevents the smallest light spot focused on the pixel array 2808 from being too small as to cause aliasing. Where a color filter of a mosaic pattern covers the pixel array 2808, aliasing can give rise to color moiré artifacts after a color interpolation. For example, the smallest diameter of a circle encircling 84% of the visible light power of a light spot on the main pixel array 2808 ("smallest main diameter") may be kept larger than one and a half pixel width but less than two pixel widths by use of the optical lowpass filter. For example, if the main pixel array 2808 has a pixel width of 4.5 um, whereas the smallest diameter is 2.0 um without optical lowpass filtering, the optical lowpass filter 2840 may be selected to make the light spot 6.7 um or larger in diameter.

The auxiliary pixel array 108" may comprise one or more arrays of photodetectors. Each of the arrays may or may not be covered by a color filter array of a color mosaic pattern. The array(s) in auxiliary pixel array 108" outputs image(s) in analog signals that are converted to digital signals 130 by A/D Converter 110. The images are sent to the focus signal generator 120. A color interpolator 148 may generate the missing colors for images generated from pixels covered by color filters. If auxiliary pixel array 108" comprises multiple arrays of photodetectors, each array may capture a sub-image that corresponds to a portion of the image captured by the main pixel array 2808. The multiple arrays may be physically apart by more than a hundred pixel widths, and may or may not share a semiconductor substrate. Where the pixel arrays within auxiliary pixel array 108" do not share a semiconductor substrate, they may be housed together in a package (not shown).

Main A/D Converter 2810 converts analog signals from the Main Pixel Array 2808 into digital main image data signal 2830, which is sent to the processor 112, where the image captured on the Main Pixel Array 2808 may receive image processing such as color interpolation, color correction, and image compression/decompression and finally be stored in memory card 116.

An array of photodetectors in the auxiliary pixel array 108" may have a pixel width ("auxiliary pixel width") that is smaller than a pixel width of the main pixel array 2808 ("main pixel width"). The auxiliary pixel width may be as small as half of the main pixel width. If an auxiliary pixel is covered by a color filter and the auxiliary pixel width is less than 1.3 times the smallest spot of visible light without optical lowpass filtering, a second optical lowpass filter may be inserted in front of the auxiliary array 108" to increase the smallest diameter on the auxiliary pixel array 108" ("smallest auxiliary diameter") to between 1.3 to 2 times as large but still smaller than the smallest main diameter, preferably 1.5. The slight moiré in the auxiliary image is not an issue as the auxiliary image is not presented to the user as the final captured image.

FIG. 50 illustrates how edge widths may vary about a sharp focus position for main images from the main pixel array 2808 (solid curve) and auxiliary images from the auxiliary pixel array 108" (dashed curve). The auxiliary images give sharper slopes even as the main images reach the targeted sharp edge width of 2. The auxiliary image is permitted to reach below the targeted sharp edge width, since moiré due to aliasing is not as critical in the auxiliary image, as it is not presented to the user as a final image. This helps to sharpen the slope below and above the sharp edge width. The sharper slope is also helped by the auxiliary pixel width being smaller than the main pixel width.

The shaded region in FIG. 50 indicates a good region within which to control the focus position to keep the main image in sharp focus. A change in focus position outwards will cause the edge width to increase in the auxiliary image, whereas a change inwards will cause the it to decrease. To maintain the main image's edge widths near the sharp edge width, a linear feedback control system may be employed to target the middle auxiliary edge width value within the shade region and to use as feedback signal the edge widths generated from the auxiliary images.

The auxiliary pixel array 108", A/D Converter 110, focus signal generator 120 together may be housed in a package 142 and constitute an auxiliary sensor 150. The auxiliary sensor 150 may further comprise a color interpolator 148.

FIG. 48 shows an alternate embodiment of auto-focus image pickup apparatus 103' similar to apparatus 103 except focus signal generator 120' replaces focus signal generator 120. The auxiliary pixel array 108", A/D Converter 110, focus signal generator 120' together may be housed in a package 142 and constitute an auxiliary sensor 150'. The auxiliary sensor 150 may further comprise a color interpolator 148.

FIG. 49 shows an alternate embodiment of auto-focus image pickup apparatus 103". The focus signal generator 120 and the processor 112" may be housed in a package 144 as a camera controller, separate from the auxiliary pixel array 108". The processor 112" is similar to processor 112 except that processor 112" receives images from the main pixel array 2808 as well as the auxiliary pixel array 108". The processor 112" may perform a color interpolation, a color correction, a compression/decompression, and a storing to memory card 116 for the images received on signal 2830 similar to the processing that the processor 112 may perform on signal 130 in FIG. 2. Unlike in FIG. 2, here the images received on signal 130 need not receive compression/decompression and storing to memory card 116. The processor 112" may perform color interpolation on images received on signal 130 for pixels that are covered by color filters in the auxiliary pixel array 108" and send the color interpolated images to the focus signal generator 120 on signal 146.

The auto-focus image pickup system 102, 102', 103, 103', 103" may include a computer program storage medium (not shown) that comprises instructions that causes the processor 112, 112', 112" respectively, and/or the focus signal generator 120, 120' to perform one or more of the functions described herein. By way of example, the instructions may cause the processor 112 or the generator 120' to perform a slant correction for an edge width in accordance with the flowchart of FIG. 7. As another example, the instructions may cause the processor 112' or the generator 120 to perform an edge width filtering in accordance with the above description for Width Filter 209. Alternately, the processor 112, 112' or the generator 120, 120' may be configured to have a combination of firmware and hardware, or a pure hardware implementation for one or more of the functions contained therein. For example, in generator 120, a slant correction may be performed in pure hardware and a length filter 212 performed according to instructions in a firmware.

While a memory card 116 is shown as part of system 102, any nonvolatile storage medium may be used instead, e.g. hard disk drive, wherein images stored therein are accessible by a user and may be copied to a different location outside and away from the system 102.

One or more parameters for use in the system, for instance the sharp_edge_width, may be stored in a non-volatile memory in a device within the system. The device may be a flash memory device, the processor, or the image sensor, or the focus signal generator as a separate device from those. One or more formulae for use in the system, for example for calculating the concatenated length threshold, or for calculating beta may likewise be stored as parameters or as computer-executable instructions in a non-volatile memory in one or more of those devices.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

The invention claimed is:

1. A method to generate a focus signal from a plurality of edge widths to indicate a degree of image sharpness in an image, each edge width belonging to one among a plurality of edges in the image, comprising:
    determining that a gradient profile across an edge in the image has a first value for a first parameter measured at a first gradient level and a second value for a second parameter measured at a second gradient level, the first and second gradient levels being different gradient values defined as a first fraction and a second fraction, respectively, of a peak gradient value of the edge, both the first and second parameters being determined on bases of the gradient profile to both sides of a peak of the gradient profile;
    determining whether the first value meets a predetermined criterion that depends on the second value; and,
    rejecting or attenuating a contribution of an edge width of the edge in generating the focus signal where the edge does not meet the predetermined criterion.

2. The method of claim 1, wherein the first constraint requires the first value to be, to within a predetermined tolerance, the second value multiplied with a predetermined multiplier.

3. The method of claim 2, wherein the predetermined multiplier is a function of the edge width.

4. The method of claim 2, wherein the predetermined multiplier is interpolated from a sequence of multipliers, each multiplier for a different edge width.

5. The method of claim 1, wherein the first parameter is either:
    a width of the gradient profile measured at the first gradient level; or,
    a count of pixels in the gradient profile that have gradient levels anywhere from the first gradient level to a peak gradient level of the gradient profile.

6. The method of claim 5, wherein the second parameter is either:
    a width of the gradient profile measured at the second gradient level; or,
    a count of pixels in the gradient profile that have gradient levels anywhere from the second gradient level to a peak gradient level of the gradient profile.

7. The method of claim 5, wherein the width is measured from a gradient or interpolated gradient on one side of the peak to another gradient or interpolated gradient on the other side of the peak.

8. The method of claim 1, wherein the first and second gradient levels are within a range from 10% to 90% of a peak gradient level of the gradient profile.

9. The method of claim 1, wherein the first and second gradient levels are within a range from 15% to 85% of the peak gradient level of the gradient profile.

10. The method of claim 1, wherein the first and second gradient levels are within a range from 20% to 80% of the peak gradient level of the gradient profile.

11. The method of claim 1, wherein the gradient profile is a sequence of consecutive all-positive or all-negative gradients across a plurality of pixels arrayed side-by-side in a first direction plotted against a sequence of consecutive integers, a peak gradient within the sequence has a peak gradient value whose magnitude is maximal among magnitudes of gradient values of all gradients within the sequence, and each side of the peak gradient includes at least a gradient.

12. The method of claim 3, wherein the edge width is corrected for a slant of the edge for determining the first constraint.

13. The method of claim 1, wherein the first constraint depends on a slant of the edge.

14. A method to generate a focus signal from a plurality of edges in an image to indicate a degree of image sharpness in the image, each edge contributing a width to the focus signal, comprising:
    rejecting or deemphasizing, among a first plurality of edges whose first widths are same, any edge whose second width lies outside a first acceptance range, each edge among said first plurality of edges having a gradient profile with a peak gradient, said first width of said each edge being a width of said gradient profile at a first gradient level that is a first fraction of said peak gradient, said first fraction being common across said first plurality of edges,
    wherein said second width of said any edge is another width of said gradient profile of said any edge at a second gradient level that is a second fraction of said peak gradient of said any edge, said second fraction being common across said first plurality of edges.

15. The method of claim 14, further comprising:
    rejecting or deemphasizing, among a second plurality of edges that all have a same third width across their respective gradient profiles at respective gradient levels of said first fraction of their respective peak gradients, any edge whose fourth widths lies outside a second acceptance range, said third width and said second acceptance range being different from said first width and said first acceptance range respectively, said fourth widths being widths across said respective gradient profiles at respective gradient levels of said second fraction of said respective peak gradients.

16. The method of claim 14, wherein said rejecting or deemphasizing is performed in an Edge Detection & Width Measurement Unit housed in a package together with a pixel array.

17. The method of claim 14, wherein said rejecting or deemphasizing is performed in an Edge Detection & Width Measurement Unit housed in a package together with a processor that controls a focus position of a focus lens.

18. The method of claim 14, wherein said rejecting or deemphasizing is performed in an Edge Detection & Width Measurement Unit .

19. The method of claim 14, wherein said rejecting or deemphasizing involves executing computer-executable instructions.

20. A non-transitory computer readable medium, comprising computer executable instructions and or parameters for executing the method of claim 14.

* * * * *